United States Patent
Zhan

(10) Patent No.: US 10,587,731 B2
(45) Date of Patent: Mar. 10, 2020

(54) METHOD AND SYSTEM FOR PROVIDING ELECTRONIC DOCUMENT, MOTHER BOOK SERVER AND CHILD BOOK CLIENT

(71) Applicant: BAIDU ONLINE NETWORK TECHNOLOGY (BEIJING) CO., LTD., Beijing (CN)

(72) Inventor: Jun Zhan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 999 days.

(21) Appl. No.: 14/759,992

(22) PCT Filed: Jan. 21, 2013

(86) PCT No.: PCT/CN2013/070766
§ 371 (c)(1),
(2) Date: Jul. 9, 2015

(87) PCT Pub. No.: WO2014/107919
PCT Pub. Date: Jul. 17, 2014

(65) Prior Publication Data
US 2015/0341468 A1 Nov. 26, 2015

(30) Foreign Application Priority Data
Jan. 9, 2013 (CN) .......................... 2013 1 0008148

(51) Int. Cl.
*H04L 29/06* (2006.01)
*H04L 29/08* (2006.01)
*G06F 16/93* (2019.01)

(52) U.S. Cl.
CPC .............. *H04L 67/42* (2013.01); *G06F 16/93* (2019.01); *H04L 63/10* (2013.01);
(Continued)

(58) Field of Classification Search
CPC .... G06F 17/30011; H04L 67/06; H04L 63/10; H04L 67/42; H04L 67/02; H04L 65/4084; H04L 67/147
See application file for complete search history.

(56) References Cited

U.S. PATENT DOCUMENTS 8,856,647 B2 * 10/2014 Howell ................. G06F 17/214
715/243
9,736,515 B1 * 8/2017 Joshi ..................... H04N 21/262
(Continued)

FOREIGN PATENT DOCUMENTS

CN       1929427       3/2007
CN     101661459       3/2010
(Continued)

*Primary Examiner* — Shean Tokuta
*Assistant Examiner* — Juan C Turriate Gastulo
(74) *Attorney, Agent, or Firm* — Hodgson Russ LLP

(57) ABSTRACT

A method and a system for providing an electronic document, a mother book server and a child book client are provided. The method includes: generating a mother book by a mother book server; receiving, by the mother book server, a request message transmitted by a child book client; generating, by the mother book server, a corresponding child book for the child book client according to the request message and the mother book, and transmitting the child book to the child book client; acquiring, by the child book client, a first position information of a content corresponding to an operation instruction in the mother book, when the child book client receives the operation instruction from a user; and acquiring, by the child book client, the content corresponding to the operation instruction from the mother book server according to the first position information.

19 Claims, 5 Drawing Sheets

(52) U.S. Cl.
CPC .......... *H04L 65/4084* (2013.01); *H04L 67/02* (2013.01); *H04L 67/06* (2013.01); *H04L 67/147* (2013.01)

(56) References Cited

U.S. PATENT DOCUMENTS

| | | | | |
|---|---|---|---|---|
| 2007/0171482 | A1* | 7/2007 | Iwasaki | G06F 17/30011 358/452 |
| 2008/0235221 | A1* | 9/2008 | Burns | G06F 17/30716 |
| 2009/0094290 | A1* | 4/2009 | Shiimori | G06F 16/93 |
| 2010/0088746 | A1* | 4/2010 | Kota | G06F 21/33 726/3 |
| 2011/0276569 | A1* | 11/2011 | Kanefsky | G06F 17/30902 707/736 |
| 2012/0233242 | A1* | 9/2012 | Murray | H04L 67/22 709/203 |
| 2013/0291126 | A1* | 10/2013 | Thomson | G06F 17/30014 726/30 |

FOREIGN PATENT DOCUMENTS

| | | |
|---|---|---|
| CN | 101989988 | 3/2011 |
| CN | 101996194 | 3/2011 |
| CN | 102118685 | 7/2011 |
| CN | 102622332 | 8/2012 |
| CN | 102622400 | 8/2012 |
| JP | H10124429 | 5/1998 |
| JP | H11338780 | 12/1999 |
| JP | 2003337825 | 11/2003 |
| JP | 2004029943 | 1/2004 |
| JP | 2005258841 | 9/2005 |
| JP | 2006330981 | 12/2006 |
| JP | 2011123740 | 6/2011 |
| JP | 2012226439 | 11/2012 |
| JP | 2012242983 | 12/2012 |

* cited by examiner

METHOD AND SYSTEM FOR PROVIDING ELECTRONIC DOCUMENT, MOTHER BOOK SERVER AND CHILD BOOK CLIENT

CROSS-REFERENCE TO RELATED APPLICATION

This application is a National Stage application of International patent application PCT/CN2013/070766, filed with the State Intellectual Property Office of P. R. China on Jan. 21, 2013, which claims priority to Chinese Patent Application No. 201310008148.5, filed on Jan. 9, 2013, the disclosures of which are incorporated herein by reference in their entirety.

FIELD

The present disclosure relates to a technical field of electronic documents, and more particularly, to a method for providing an electronic document, a system for providing an electronic document, a mother book server and a child book client.

BACKGROUND

With the development of Internet and wireless Internet technology, traditional publishing industry is transformed into electronic publishing which, along with electronic books, has prevailed in the industry. There are three main formats of electronic books at present, namely, PDF format, ePub format (i.e. a zip package of HTML webpages) and Mobi format (regarded as a simplified PDF format). Amazon is replacing Mobi with new KF8 format that can support HTML5.

The above three formats may be divided into two categories. The first category involves electronic documents whose format and layout cannot be rearranged, such as electronic documents in PDF format. The second category involves electronic documents whose layout can be automatically rearranged in terms of resolution of a reader, such as electronic documents in ePub format. However, the document format that supports automatic rearrangement of the electronic documents according to the resolution of the reader is devoid of concept of page number, i.e. displaying inconsistent results on various terminal carriers. Moreover, for a little more complex layout, the automatic rearrangement effect is poor. For lack of page numbers after the automatic rearrangement, it is difficult to communicate and collaboratively edit the electronic documents of this kind.

As for the document format that does not support rearrangement, for example, PDF format may support any complex layout, but the layout cannot be rearranged automatically after the initial arrangement is completed, and hence the display effect is poor by automatically zooming in and out. Moreover, this kind of document format does not allow collaborative editing.

SUMMARY

The present disclosure seeks to solve at least one of the technical problems existing in the related art to at least some extent.

Accordingly, a first objective of the present disclosure is to provide a method for providing an electronic document. The method can provide corresponding child books for different child book clients, and have the advantages of good display effect and copyright protection of electronic documents. Moreover, the existence of a mother book server ensures the consistency of display effects on respective child book clients (terminals) and the completeness of the content.

A second objective of the present disclosure is to provide a system for providing an electronic document.

A third objective of the present disclosure is to provide a mother book server.

A fourth objective of the present disclosure is to provide a child book client.

A fifth objective of the present disclosure is to provide another method for providing an electronic document.

A sixth objective of the present disclosure is to provide another system for providing an electronic document.

A seventh objective of the present disclosure is to provide another mother book server.

An eighth objective of the present disclosure is to provide another child book client.

In order to achieve above objectives, embodiments of a first aspect of the present disclosure provide a method for providing an electronic document. The method includes: generating a mother book by a mother book server; receiving, by the mother book server, a request message transmitted by a child book client; generating, by the mother book server, a corresponding child book for the child book client according to the request message and the mother book, and transmitting the child book to the child book client; acquiring, by the child book client, a first position information of a content corresponding to an operation instruction in the mother book, when the child book client receives the operation instruction from a user; and acquiring, by the child book client, the content corresponding to the operation instruction from the mother book server according to the first position information.

With the method for providing an electronic document according to embodiments of the present disclosure, the mother book server automatically rearranges the mother book online based on the request message of the child book client (for example, the size of a screen of the child book client) to generate a child book suitable for reading on the child book client, thus guaranteeing a clear display effect of the child book at various clients. Moreover, the existence of the mother book server ensures the consistency of the display effects on respective child book clients (terminals) and the completeness of the content. The method according to the embodiments of the present disclosure also has an advantage of high adaptability.

Moreover, in the embodiments of the present disclosure, since the child books in various child book clients and the mother book have the unique and identical serial number, it can be guaranteed that the various child book clients communicate and edit collaboratively regarding content of a certain page, such that the inventive method may be applied to distance education and provide great convenience for the distance education and the like. In addition, the mother book server can provide an editable or a non-editable child book to the child book client, and the authority of the child book client is managed by limiting the number of pages of the mother book and content capacity available to the child book client, thus guaranteeing the copyright of the mother book and avoiding the occurrence of piracy. The mother book server can generate a child book for the child book client according to the customized information of the child book client, thus satisfying the requirements of different users on the effect of reading the child book.

In addition, the method according to the above embodiments of the present disclosure may further have the following additional technical features.

In some examples, the child book includes a child information file, and the child book client acquires the first position information of the content corresponding to the operation instruction in the mother book according to the child information file.

In some examples, the child information file records a second position information of a page of a content in the child book in the mother book.

In some examples, generating the mother book by the mother book server further includes: generating the mother book by the mother book server according to a document compiled by an author.

In some examples, generating the mother book by the mother book server further includes: receiving, by the mother book server, a query transmitted by the child book client; performing a search by the mother book server according to the query to obtain a plurality of search results; and aggregating the plurality of search results by the mother book server to generate the mother book.

In some examples, the method further includes: generating, by the mother book server, a serial number corresponding to the mother book according to a content of the mother book.

In some examples, the mother book and the child book have identical serial numbers.

In some examples, the request message includes format information of the child book desired by the child book client, and the mother book server generates the corresponding child book for the child book client according to the format information.

In some examples, the method further includes: generating, by the mother book server, fingerprint information corresponding to the mother book according to a part of the content of the mother book.

In some examples, the method further includes: acquiring copyright protection information of the mother book by the mother book server; and selecting a protected format or a non-protected format of the child book to transmit the format to the child book client by the mother book server according to the copyright protection information of the mother book.

In some examples, the method further includes: acquiring authority information of the child book client by the mother book server; and managing, by the mother book server, the content acquired by the child book client according to the authority information.

In some examples, the authority information includes page information of the mother book available to the child book client.

In some examples, the authority information includes content capacity information of the mother book available to the child book client.

In some examples, the method further includes: receiving customized information by the child book client from the user, and sending the customized information to the mother book server by the child book client; and generating the child book by the mother book server for the child book client according to the customized information.

In some examples, there are a plurality of child book clients.

Embodiments of a second aspect of the present disclosure provide a system for providing an electronic document. The system includes a mother book server and at least one child book client, in which the mother book server is configured to generate a mother book, to generate a corresponding child book for the child book client according to a request message transmitted by the child book client and the mother book, and to transmit the child book to the child book client; the child book client is configured to transmit the request message to the mother book server, to acquire a first position information of a content corresponding to an operation instruction in the mother book when receiving the operation instruction from a user, and to acquire the content corresponding to the operation instruction from the mother book server according to the first position information.

With the system for providing an electronic document according to the embodiments of the present disclosure, the mother book server automatically rearranges the mother book online based on the request message of the child book client (for example, the size of a screen of the child book client) to generate a child book suitable for reading at the child book client, thus guaranteeing a clear display effect of the child book at various clients. Moreover, the existence of the mother book server ensures the consistency of the display effects on respective child book clients (terminals) and the completeness of the content. The system according to the embodiments of the present disclosure also has an advantage of high adaptability.

Moreover, in the embodiments of the present disclosure, since the child books in various child book clients and the mother book have the unique and identical serial number, it can be guaranteed that the various child book clients communicate and edit collaboratively regarding content of a certain page, such that the inventive system may be applied to distance education and may provide great convenience for the distance education and the like. In addition, the mother book server can provide an editable or a non-editable child book to the child book client, and the authority of the child book client is managed by limiting the number of pages of the mother book and content capacity available to the child book client, thus guaranteeing the copyright of the mother book and avoiding the occurrence of piracy. The mother book server can generate a child book for the child book client according to the customized information of the child book client, thus satisfying the requirements of different users on the effect of reading the child book.

In addition, the system according to the above embodiments of the present disclosure may further have the following additional technical features.

In some examples, the child book includes a child information file, and the child book client acquires the first position information of the content corresponding to the operation instruction in the mother book according to the child information file.

In some examples, the child information file records a second position information of a page of a content in the child book in the mother book.

In some examples, the mother book server generates the mother book according to a document compiled by an author.

In some examples, the mother book server receives a query transmitted by the child book client, performs a search according to the query to obtain a plurality of search results, and aggregates the plurality of search results to generate the mother book.

In some examples, the mother book server is configured to generate a serial number corresponding to the mother book according to a content of the mother book.

In some examples, the mother book and the child book have identical serial numbers.

In some examples, the request message includes format information of the child book desired by the child book client, and the mother book server generates the corresponding child book for the child book client according to the format information.

In some examples, the mother book server is further configured to generate fingerprint information corresponding to the mother book according to a part of the content of the mother book.

In some examples, the mother book server is further configured to acquire copyright protection information of the mother book, and to select and transmit a protected format or a non-protected format of the child book to the child book client according to the copyright protection information of the mother book.

In some examples, the mother book server is further configured to acquire authority information of the child book client, and to manage the content acquired by the child book client according to the authority information.

In some examples, the authority information includes page information of the mother book available to the child book client.

In some examples, the authority information includes content capacity information of the mother book available to the child book client.

In some examples, the child book client is further configured to receive customized information from the user and send the customized information to the mother book server; and the mother book server is further configured to generate the child book for the child book client according to the customized information.

In some examples, there are a plurality of child book clients.

Embodiments of a third aspect of the present disclosure provide a mother book server. The mother book server includes a mother book generating module configured to generate a mother book; a receiving module configured to receive a request message transmitted by a child book client; a child book generating module configured to generate a corresponding child book for the child book client according to the request message and the mother book, and to transmit the child book to the child book client; and a managing module configured to receive an operation request generated by the child book client according to an operation instruction from a user and a first position information of a content corresponding to the operation instruction in the mother book, and to transmit the content corresponding to the operation instruction to the child book client according to the first position information.

In addition, the mother book server according to the above embodiments of the present disclosure further has the following additional technical features.

In some examples, the child book includes a child information file, such that the child book client acquires the first position information of the content corresponding to the operation instruction in the mother book according to the child information file.

In some examples, the child information file records a second position information of a page of a content in the child book in the mother book.

In some examples, the mother book generating module generates the mother book according to a document compiled by an author.

In some examples, the mother book server further includes: a searching module configured to perform a search according to a query transmitted by the child book client to obtain a plurality of search results, such that the mother book generating module aggregates the plurality of search results to generate the mother book.

In some examples, the mother book server further includes: a serial number generating module configured to generate a serial number corresponding to the mother book according to a content of the mother book.

In some examples, the mother book and the child book have identical serial numbers.

In some examples, the request message includes format information of the child book desired by the child book client, and the child book generating module generates the corresponding child book for the child book client according to the format information.

In some examples, the mother book server further includes: a fingerprint generating module configured to generate fingerprint information corresponding to the mother book according to a part of the content of the mother book.

In some examples, the child book generating module is configured to select and transmit a protected format or a non-protected format of the child book to the child book client according to the copyright protection information of the mother book.

In some examples, the managing module is configured to acquire authority information of the child book client, and to manage the content acquired from the child book client according to the authority information.

In some examples, the authority information includes page information of the mother book available to the child book client.

In some examples, the authority information includes content capacity information of the mother book available to the child book client.

In some examples, the child book generating module is further configured to generate the child book for the child book client according to customized information transmitted by the child book client.

In some examples, there are a plurality of child book clients.

Embodiments of a fourth aspect of the present disclosure provide a child book client. The child book client includes: a transmitting module configured to transmit a request message to a mother book server; a receiving module configured to receive a child book generated by the mother book server according to the request message and a mother book in the mother book server; and an operation control module configured to receive an operation instruction from a user, to acquire a first position information of a content corresponding to the operation instruction in the mother book, and to obtain the content corresponding to the operation instruction in the mother book server according to the first position information.

In addition, the child book client according to the above embodiments of the present disclosure further has the following additional technical features.

In some examples, the child book includes a child information file, and the child book client acquires the first position information of the content corresponding to the operation instruction in the mother book according to the child information file.

In some examples, the child information file records a second position information of a page of a content in the child book in the mother book.

In some examples, the mother book has a serial number generated according to a content of the mother book.

In some examples, the mother book and the child book have identical serial numbers.

In some examples, the request message includes format information of the child book desired by the child book client, such that the mother book server generates the corresponding child book for the child book client according to the format information.

In some examples, the request message includes customized information, such that the mother book server generates the child book for the child book client according to the customized information.

Embodiments of a fifth aspect of the present disclosure provide a method for providing an electronic document. The method includes: generating a mother book by a mother book server; receiving, by the mother book server, a request message transmitted by a child book client, in which the request message comprises format information of the child book desired by the child book client; and generating, by the mother book server, a corresponding child book for the child book client according to the request message and the mother book, and transmitting the child book to the child book client.

With the method for providing an electronic document according to the embodiments of the present disclosure, the mother book server automatically rearranges the mother book online based on the request message of the child book client (for example, the size of a screen of the child book client) to generate a child book suitable for reading at the child book client, thus guaranteeing a clear display effect of the child book at various clients. The method according to the embodiments of the present disclosure also has an advantage of high adaptability.

In some examples, the method further includes: receiving by the child book client customized information from the user and sending the customized information to the mother book server by the child book client; and generating the child book by the mother book server for the child book client according to the customized information.

In some examples, there are a plurality of child book clients.

Embodiments of a sixth aspect of the present disclosure provide a system for providing an electronic document. The system includes a mother book server and at least one child book client, in which the at least one child book client is configured to transmit a request message to the mother book server, the request message comprising format information of the child book desired by the child book client; and the mother book server is configured to generate a mother book, to generate a corresponding child book for the child book client according to the request message and the mother book, and to transmit the child book to the child book client.

With the system for providing an electronic document according to the embodiments of the present disclosure, the mother book server automatically rearranges the mother book online based on the request message of the child book client (for example, the size of a screen of the child book client) to generate a child book suitable for reading at the child book client, thus guaranteeing a clear display effect of the child book at various clients. The system according to the embodiments of the present disclosure also has an advantage of high adaptability.

In some examples, the child book client is further configured to receive customized information from the user and send the customized information to the mother book server, such that the mother book server generates the child book for the child book client according to the customized information.

In some examples, there are a plurality of child book clients.

Embodiments of a seventh aspect of the present disclosure provide a mother book server. The mother book server includes a mother book generating module configured to generate a mother book; a receiving module configured to receive a request message transmitted by a child book client, in which the request message comprises format information of the child book desired by the child book client; and a child book generating module configured to generate a corresponding child book for the child book client according to the request message and the mother book, and to transmit the child book to the child book client.

In some examples, the child book generating module generates the child book for the child book client according to customized information transmitted by the child book client.

In some examples, there are a plurality of child book clients.

Embodiments of a seventh aspect of the present disclosure provide a child book client. The child book client includes: a transmitting module configured to transmit a request message to a mother book server, in which the request message comprises format information of the child book desired by the child book client; and a receiving module configured to receive a child book generated by the mother book server according to the request message and a mother book in the mother book server.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
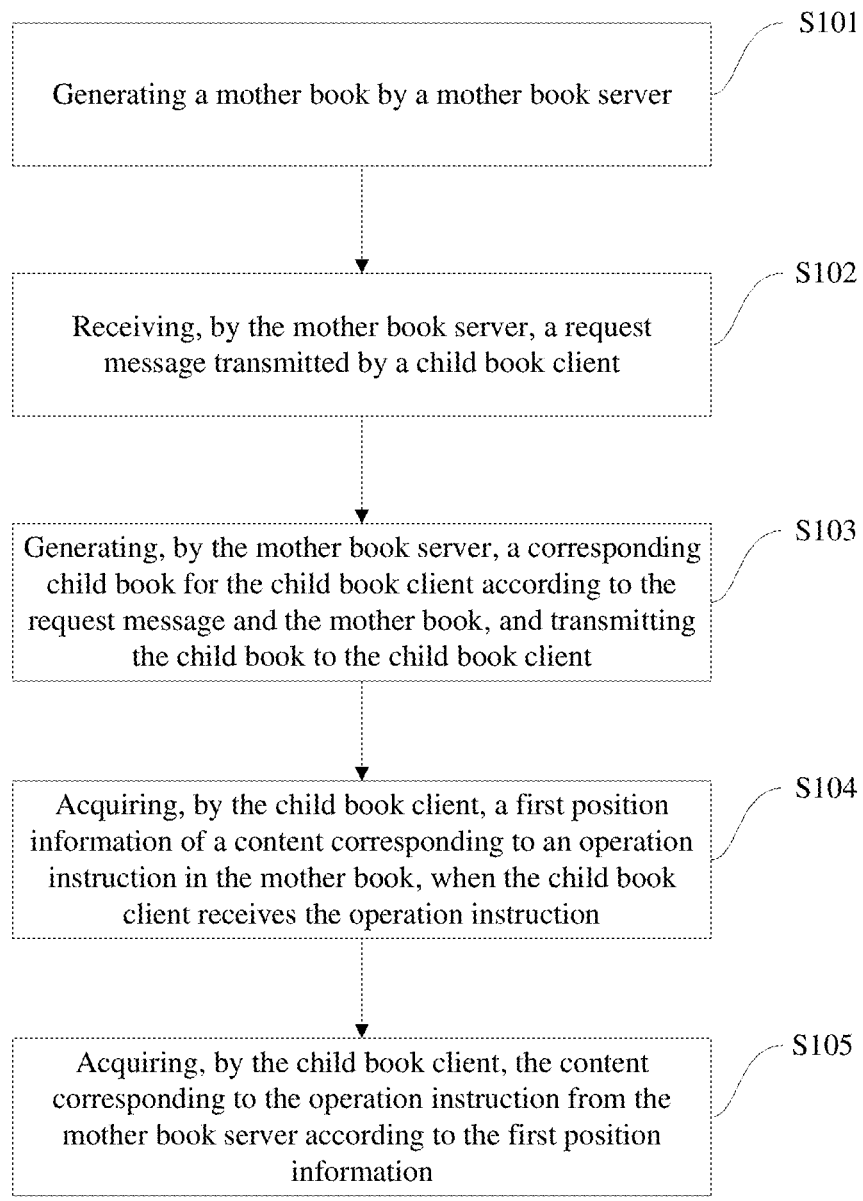
FIG. 1 is a flow chart of a method for providing an electronic document according to an embodiment of the present disclosure.

Embodiments of the present disclosure will be described in detail and examples of the embodiments will be illustrated in the drawings, wherein same or similar reference numerals are used to indicate same or similar members or members with same or similar functions. The embodiments described herein with reference to drawings are explanatory, which are used to illustrate the present disclosure, but shall not be construed to limit the present disclosure.

In the specification, unless specified or limited otherwise, relative terms such as "longitudinal," "lateral," "above," "below," "front", "rear", "left," "right," "vertical," "horizontal," "top," "bottom" as well as derivative thereof should be construed to refer to the orientation as then described or as shown in the drawings under discussion. These relative terms are for convenience of description and do not require that the present disclosure be constructed or operated in a particular orientation, and thus shall not be construed to limit the present disclosure.

These and other aspects of embodiments of the present disclosure will be clear with reference to the following descriptions and drawings. In these descriptions and drawings, some particular implementations in embodiments of the present disclosure are specifically disclosed, for illustrating some ways of implementing the principle of embodiments of the present disclosure. However, it should be understood that, the scope of embodiments of the present disclosure is not limited to this. Instead, embodiments of the present disclosure include all variations, modifications and equivalents falling in the spirit and scope of the appended claims.

A method for providing an electronic document, a system for providing an electronic document, a mother book server and a child book client will be described in the following with reference to drawings.

As described in one or more embodiments hereinafter, a mother book refers to a source code and metadata provided by an author or an automatic editing system; a child book refers to a document generated by the mother book server according to the source code of the mother book. The mother book server is responsible for storing and managing the mother book, generating the child book, and managing interaction between the mother book and the child book, i.e. managing interaction between the mother book server and the child book client.

FIG. 1 is a flow chart of a method for providing an electronic document according to an embodiment of the present disclosure. As shown in FIG. 1, the method includes the following steps.

In step 101, the mother book server generates the mother book. The mother book server is but not limited to a cloud server. In examples of the present disclosure, the mother book server may generate the mother book in various manners. For example, the mother book server generates the mother book according to a document compiled by the author. That is, the author compiles the document according to a designated format, and the mother book server generates the mother book based on the compiled document. In this embodiment, the designated format is but not limited to a BDF format, and any other known formats can be employed.

In addition, embodiments of the present disclosure further provide another method for generating the mother book. Specifically, the method includes the following steps.

In step S1, the mother book server receives a query transmitted by the child book client. The child book client can be a smart phone, a tablet computer, a personal computer (PC), an electronic book reader, etc. For example, the mother book server has the function of a search engine or relies on an existing search engine, like Baidu search engine.

In step S2, the mother book server performs a search according to the query to obtain a plurality of search results.

In step S3, the mother book server aggregates the plurality of search results to generate the mother book.

In embodiments of the present disclosure, the mother book server can extract resulting information from the plurality of search results and coverts the information into the mother book. Specifically, the mother book server receives the query transmitted by the user via the child book client, and the mother book server performs the search according to the query to obtain the plurality of search results. Meanwhile, the mother book server can automatically aggregate the plurality of search results according to a correlation algorithm in the background, and display an electronic document or an electronic book. In a specific example of the present disclosure, the correlation algorithm determines the correlation according to, for example, clicking on logs, or automatically removes repeated and irrelevant content (such as navigation bars on a webpage, copyright information at the bottom, etc.) using relevant entries and recommended entries from Baidupedia and Wikipedia.

Further, in the process of typesetting and generating the mother book, the mother book server can employ a typesetting program, such as Xelatex typesetting program with open source codes, typesetting programs of Founder Bookmaker, Indesign typesetting program of Aode, etc. The mother book generated is but not limited to a mother book in PDF format. In this process, the mother book server stores typesetting information (for example, in the Xelatex typesetting program, the typesetting information is called reverse reference syntax file, i.e. able to jump to the typesetting source code by clicking the PDF). In this example, the mother book can include a zip package containing original webpage information, PDF and typesetting information, and the mother book is default to be in a standard format. The mother book is stored in the mother book server for later proofreading, updating or citation.

In step 102, the mother book server receives a request message transmitted by the child book client. The request message can be transmitted to the mother book server according to an instruction of the user after the user logs in a particular electronic book program. In embodiments of the present disclosure, the request message includes information for identifying the mother book, such as an identifier or a serial number corresponding to the mother book.

In step 103, the mother book server generates a corresponding child book for the child book client according to the request message and the mother book, and transmits the child book to the child book client.

In the embodiment, the request message includes but is not limited to format information of the child book desired by the child book client, and the mother book server generates the corresponding child book for the child book client according to the format information. In some embodiments of the present disclosure, the format information of the child book desired by the child book client can be derived from the type or model of the child book client. For example, if the mother book server finds a mother book corresponding to the request message according to the request message, the mother book server generates a child book in the format requested in the request message based on the corresponding mother book. In the embodiment, the child book is generated in such a manner that the mother book server automatically rearranges the mother book online according to the type of the child book client and the like. For example, for a smart phone and a tablet computer which are two different types of child book clients and have different sizes of screens, the mother book server will automatically rearranges the mother book online based on the size of the screen to generate the child book suitable for reading at each type of child book client, thus guaranteeing a clear display effect of the child book at each type of child book client. In other examples of the present disclosure, the mother book server can generate, in advance, the child books desired by the child book clients commonly used at present, such that the mother book server can make a simple choice from the pre-generated child books according to the request message after receiving the request message from the child book client.

In step 104, when receiving an operation instruction, the child book client acquires a first position information of a content corresponding to the operation instruction in the mother book. For example, the operation instruction is to duplicate or edit a certain content displayed in the child book.

In an embodiment of the present disclosure, the child book includes a child information file, and the child book client acquires the first position information of the content corresponding to the operation instruction in the mother book according to the child information file. The child information file is generated by the mother book server while generating the child book based on the mother book. Further, the child information file records a second position information of a page of a content in the child book in the mother book. Specifically, the child book has one child information file, but different child books have different child information files, since different child books have different typesetting processes. For example, as for the Xelatex typesetting program, the child information file can be called reverse reference syntax file, i.e. it is able to jump to the typesetting source code by clicking PDF. The child information file records the positions of pages of all the texts and pictures in the child book in the mother book, and the correspondences can be calculated via X-Y coordinate transformation. Thus, the mother book server may acquire the position of a certain page of the child book in the mother book according to the child information file of the child book.

In step 105, the child book client acquires the content corresponding to the operation instruction from the mother book server according to the first position information. For instance, when the mother book server receives an instruction of duplicating the content of a certain page of the child book via the child book client, the content at the corresponding position in the mother book will be sent to the child book client according to the position of the content in the mother book, so as to realize the operation of duplicating the content.

In an example of the present disclosure, the method further includes: generating, by the mother book server, a serial number corresponding to the mother book according to a content of the mother book. For example, the mother book server subjects the content of the mother book to SHA-1 algorithm, and extracts the first N characters of a result from the SHA-1 algorithm as the above serial number, N being, for example, 12. It is known that each mother book corresponds to a unique number. Moreover, the mother book and the child book have identical serial numbers. Further, there are a plurality of child book clients, such as a mobile terminal, a tablet computer, a PC and an electronic book reader. In other words, the child books with the same serial number at various child book clients correspond to the unique mother book. Thus, all the child book clients with different screen sizes can communicate and edit collaboratively regarding content of a certain page, which may bring great convenience in specific applications such as distance education and distance learning. In addition, the child books are arranged individually for the child book clients with different screen sizes, so as to guarantee a clear display effect of the child books individually arranged at various child book clients.

Further, the method for providing an electronic document according to embodiments of the present disclosure includes: generating, by the mother book server, fingerprint information corresponding to the mother book according to a part of the content of the mother book. For example, the mother book server samples several content blocks in the mother book randomly, like five content blocks, and generates fingerprint information. The fingerprint information can be used for removal of repeated content and rapid anti-plagiarism regarding the mother book, so as to improve the quality of the mother book and avoid the occurrence of piracy, thus protecting the copyright of the mother book.

In order to further improve the protection of copyright of the mother book, the mother book server acquires the copyright protection information of the mother book. The mother book server selects and transmits a protected format or a non-protected format of the child book to the child book client according to the copyright protection information of the mother book. For example, if the author of the mother book has a relatively low requirement on protection level of the mother book, the mother book server can select the non-protected format of the child book and transmit it to the child book client, in which the non-protected format of the child book may be a complete child book in PDF format, and the content thereof can be edited or duplicated. If the author of the mother book has a higher requirement on protection level of the mother book, the mother book server will print the mother book in PDF format into pictures for generating the child book, and transmits the child book to the child book client. In the embodiment, the format of the pictures is but not limited to PNG format or DJVU format. Hence, the copyright of the mother book can be protected in a high level, so as to prevent the copyright of the mother book from infringement. Further, after the child book client obtains the child book, it can be judged whether the format of the child book is original PDF format or DRM-protected PDF (i.e. pictures). If the user demands to duplicate or search the protected PDF, the child book client can calculate the position of the current page in the source code of the mother book according to the typesetting information file, and the mother book server can transmit the corresponding page of text to the child book.

In order to further protect the copyright of the mother book, the method further includes: acquiring authority information of the child book client by the mother book server; managing, by the mother book server, the content acquired by the child book client according to the authority information, in which the authority information contains page information of the mother book available to the child book client. For example, this can be achieved by logging in. In other words, the child book client requires the user to log in. The logged-in users are classified—different classes of users have different levels of authority that correspond to different authority scopes, such that each logged-in user can only request for the number of pages within the authority scope, and cannot request for text from the mother book continuously, i.e. cannot request for text from the mother book repeatedly, otherwise the copyright protection cannot be fulfilled.

In addition, the authority information also includes content capacity information of the mother book available to the child book client. Specifically, for instance, the content capacity information of the mother book available to the child book client cannot exceed 50% of the total content information of the mother book. Specifically, the mother book server records a request volume of all the child book clients for the protected content, if the request volume has exceeded the predetermined value (like 50%), the child book client will be locked. When the child book client is locked, only the search function may be provided for the child book client but the duplication and copy of new pages are limited. Therefore, the copyright protection degree of the mother book is further enhanced.

In an embodiment of the present disclosure, the method further includes: receiving customized information by the child book client from the user, and sending the customized information to the mother book server by the child book client; and generating the child book for the child book client by the mother book server according to the customized information. In the embodiment, the customized information includes but is not limited to information such as font size or customized format. That is, the child book client can send a command about the font size or customized format to the mother book server, and if the mother book server verifies that the child book client is authorized, the mother book server rearranges the child book and sends the rearranged child book to the child book client.

With the method for providing an electronic document according to embodiments of the present disclosure, the mother book server automatically rearranges the mother book online based on the request message of the child book client (for example, the size of a screen of the child book client) to generate a child book suitable for reading at the child book client, thus guaranteeing a clear display effect of the child book at various clients. The method according to embodiments of the present disclosure also has an advantage of high adaptability.

Moreover, in the embodiments of the present disclosure, since the child books in various child book clients and the mother book have the unique and identical number, it can be guaranteed that the various child book clients communicate and edit collaboratively regarding content of a certain page, such that the present method may be applied to distance education and provide great convenience for the distance education. In addition, the mother book server can provide an editable or a non-editable child book to the child book client, and the authority of the child book client is managed by limiting the number of pages of the mother book and content capacity available to the child book client, thus protecting the copyright of the mother book and avoiding the occurrence of piracy. The mother book server can generate a child book for the child book client according to the customized information of the child book client, so as to satisfy the requirements of different users on the effect of reading the child book.

Figure 2:
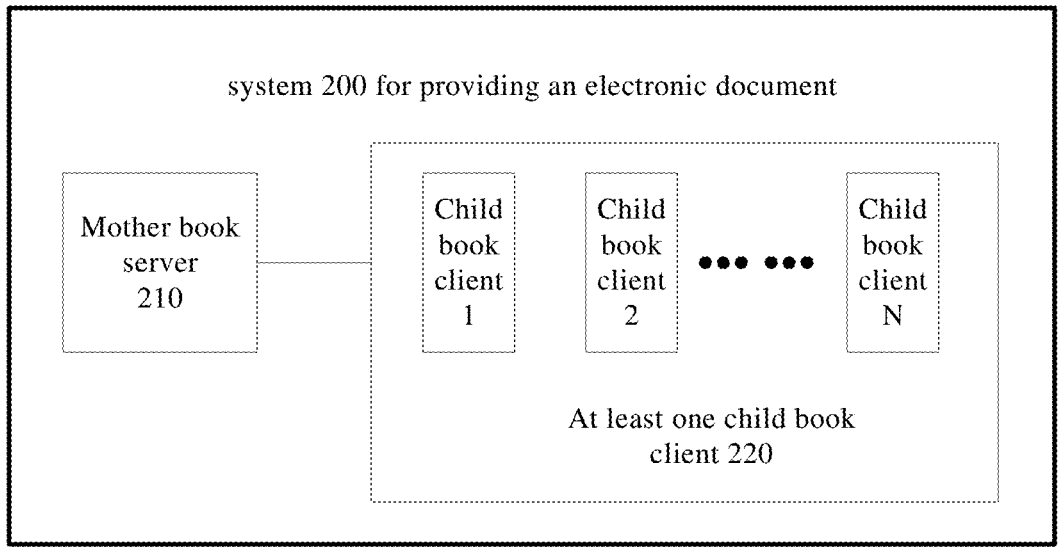
FIG. 2 is a block diagram of a system for providing an electronic document according to an embodiment of the present disclosure.

FIG. 2 is a block diagram of a system for providing an electronic document according to an embodiment of the present disclosure. As shown in FIG. 2, a system 200 for providing an electronic document according to an embodiment of the present disclosure includes a mother book server 210 and at least one child book client 220.

The mother book server 210 is configured to generate a mother book, to generate a corresponding child book for the child book client 220 according to a request message transmitted by the child book client 220 and the mother book, and to transmit the child book to the child book client 220. The child book client 220 is configured to transmit the request message to the mother book server 210, to acquire a first position information of a content corresponding to an operation instruction in the mother book when receiving the operation instruction of the user, and to acquire the content corresponding to the operation instruction from the mother book server 210 according to the first position information, in which the operation instruction is, for example, to duplicate or edit a certain content shown in the child book.

Specifically, the mother book server 210 is but is not limited to a cloud server. In examples of the present disclosure, the mother book server 210 may generate the mother book in various manners. For example, the mother book server 210 generates the mother book according to a document compiled by the author. That is, the author compiles the document according to a designated format, and the mother book server 210 generates the mother book based on the compiled document. In this embodiment, the designated format is but not limited to a BDF format, and any other known formats can be employed.

In addition, the mother book server 210 can generate the mother book in the following way. Specifically, the mother book server 210 receives a query transmitted by the child book client 220 which can be a smart phone, a tablet computer, a personal computer (PC), an electronic book reader, etc. For example, the mother book server 210 has the function of a search engine or relies on an existing search engine, like Baidu search engine. The mother book server 210 performs a search according to the query to obtain a plurality of search results, and aggregates the plurality of search results to generate the mother book.

In the above example, the mother book server 210 can extract resulting information from the plurality of search results and coverts the information into the mother book. Specifically, the mother book server 210 receives the query transmitted by the child book client 220, and the mother book server 210 performs the search according to the query to obtain the plurality of search results. Meanwhile, the mother book server 210 can automatically aggregate the plurality of search results according to a correlation algorithm in the background, and display an electronic document or an electronic book. In a specific example of the present disclosure, the correlation algorithm determines the correlation according to, for example, clicking on logs, or automatically removes repeated and irrelevant content (such as navigation bars on a webpage, copyright information at the bottom, etc.) using relevant and recommended entries from Baidupedia and Wikipedia.

Further, in the process of typesetting and generating the mother book, the mother book server 210 can employ a typesetting program, such as Xelatex typesetting program with open source codes, typesetting programs of Founder Bookmaker, typesetting programs from Aode, etc. The mother book generated is but not limited to a mother book in PDF format. In this process, the mother book server 210 stores typesetting information (for example, in the Xelatex typesetting program, the typesetting information is called reverse reference syntax file, i.e. it is able to jump to the typesetting source code by clicking the PDF). In this example, the mother book can include a zip package containing original webpage information, PDF and typesetting information, and the mother book is default to be in a standard format. The mother book is stored in the mother book server 210 for later proofreading, updating or citation.

In an embodiment of the present disclosure, the request message includes but is not limited to format information of the child book desired by the child book client 220, and the mother book server 210 generates the corresponding child book for the child book client 220 according to the format information. In some embodiments of the present disclosure, the format information of the child book desired by the child book client 220 can be derived from the type or model of the child book client 220. For example, if the mother book server 210 finds a mother book corresponding to the request message according to the request message, the mother book server 210 generates a child book in the format requested in the request message based on the corresponding mother book. In the embodiment, the child book is generated in such a manner that the mother book server 210 automatically rearranges the mother book online according to the type of the child book client 220. For example, for a smart phone and a tablet computer which are two different types of child book clients 220 and have different sizes of screens, the mother book server 210 will automatically rearranges the mother book online based on the size of the screen to generate the child book suitable for reading at each type of child book client 220, thus guaranteeing a clear display effect of the child book at each type of child book client 220. In other examples of the present disclosure, the mother book server 210 can generate, in advance, the child books desired by the child book clients 220 commonly used at present, such that the mother book server 210 can make a simple choice from the pre-generated child books according to the request message after receiving the request message from the child book client 220.

In an embodiment of the present disclosure, the child book client 220 transmits a request message transmitted to the mother book server 210, in which the request message can be transmitted to the mother book server 210 according to the instruction of the user after the user logs in a particular electronic book program. In embodiments of the present disclosure, the request message includes information for identifying the mother book, such as an identifier or a serial number corresponding to the mother book.

In some examples, the child book includes a child information file, and the child book client 220 acquires the first position information of the content corresponding to the operation instruction in the mother book according to the child information file. The child information file is generated by the mother book server 210 while generating the child book based on the mother book. Further, the child information file records a second position information of a page of a content in the child book in the mother book. Specifically, the child book has one child information file, but different child books have different child information files, since different child books have different typesetting processes. For example, as for the Xelatex typesetting program, the child information file can be called reverse reference syntax file, i.e. it is able to jump to the typesetting source code by clicking PDF. The child information file records the positions of pages of all the texts and pictures in the child book in the mother book, and the correspondences can be calculated by X-Y coordinate transformation. Thus, the mother book server 210 may acquire the position of a certain page of the child book in the mother book according to the child information file of the child book. For example, as for the process that the mother book server 210 acquires the content corresponding to the operation instruction from the mother book server 210 according to the first position information, specifically, when the mother book server 210 receives an instruction of duplicating the content of a certain page of the child book via the child book client 220, the content at the corresponding position in the mother book will be sent to the child book client 220 according to the position of the content in the mother book, so as to realize the operation of duplicating the content.

In an example of the present disclosure, the mother book server 210 can also generate a serial number corresponding to the mother book according to a content of the mother book. For example, the mother book server 210 subjects the content of the mother book to SHA-1 algorithm, and extracts the first N characters of a result from the SHA-1 algorithm as the above serial number, N being, for example, 12. It is known that each mother book corresponds to a unique number. Moreover, the mother book and the child book have identical serial numbers. Further, there are a plurality of child book clients 220, such as a mobile terminal, a tablet computer, a PC and an electronic book reader. In other words, the child books with the same number at various child book clients 220 correspond to the unique mother book. Thus, all the child book clients 220 with different screen sizes can communicate and edit collaboratively regarding content of a certain page, which may bring great convenience in specific applications such as distance education and distance learning. In addition, the child books are arranged individually for the child book clients 220 with different screen sizes, so as to guarantee a clear display effect of the child books individually arranged at various child book clients 220.

Further, the mother book server 210 can be configured to generate fingerprint information corresponding to the mother book according to a part of the content of the mother book. For example, the mother book server 210 samples several content blocks in the mother book randomly, like five content blocks, and generates fingerprint information. The fingerprint information can be used for removal of repeated content and rapid anti-plagiarism regarding the mother book, so as to improve the quality of the mother book and avoid the occurrence of piracy, thus protecting the copyright of the mother book.

In order to further improve the protection of copyright of the mother book, the mother book server 210 acquires the copyright protection information of the mother book, selects and transmits a protected format or a non-protected format of the child book to the child book client 220 according to the copyright protection information of the mother book. For example, if the author of the mother book has a relatively low requirement on protection level of the mother book, the mother book server 210 can select the non-protected format of the child book and transmit it to the child book client 220, in which the non-protected format of the child book may be a complete child book in PDF format, and the content thereof can be edited or duplicated. If the author of the mother book has a higher requirement on protection level of the mother book, the mother book server 210 will print the mother book in PDF format into pictures for generating the child book, and transmits the child book to the child book client 220. In the embodiment, the format of the pictures is but not limited to PNG format or DJVU format. Hence, the copyright of the mother book can be protected in a high level, so as to protect the copyright of the mother book from infringement. Further, after the child book client 220 obtains the child book, it can be judged whether the format of the child book is original PDF format or DRM-protected PDF (i.e. pictures). If the user demands to duplicate or search the protected PDF, the child book client 220 can calculate the position of the current page in the source code of the mother book according to the typesetting information file, and the mother book server 210 can transmit the corresponding page of text to the child book.

In order to further protect the copyright of the mother book, the mother book server 210 can be configured to acquire authority information of the child book client 220, and to manage the content acquired by the child book client 220 according to the authority information, in which the authority information contains page information of the mother book available to the child book client 220. For example, this can be achieved by logging in. In other words, the child book client 220 requires the user to log in. The logged-in users are classified—different classes of users have different levels of authority that correspond to different authority scopes, such that each logged-in user can only request for the number of pages within the authority scope, and cannot request for text from the mother book continuously, i.e. cannot request for text from the mother book repeatedly, otherwise the copyright protection cannot be fulfilled.

In addition, the authority information also includes content capacity information of the mother book available to the child book client 220. Specifically, for instance, the content capacity information of the mother book available to the child book client 220 cannot exceed 50% of the total content information of the mother book. Specifically, the mother book server 210 records a request volume of all the child book clients 220 for the protected content, and if the request volume has exceeded the predetermined value (like 50%), the child book client 220 will be locked. When the child book client is locked, only the search function may be provided for the child book client 220 but the duplication and copy of new pages are limited. Therefore, the copyright protection degree of the mother book is further enhanced.

In an embodiment of the present disclosure, the child book client 220 is configured to receive customized information from the user and send the customized information to the mother book server 210; and the mother book server 210 is configured to generate the child book for the child book client 220 according to the customized information. In the embodiment, the customized information includes but is not limited to font size or custom format. That is, the child book client 220 can send a command about the font size or customized format to the mother book server 210, and if the mother book server 210 verifies that the child book client 220 is authorized, the mother book server 210 rearranges the child book and sends the rearranged child book to the child book client 220.

With the system for providing an electronic document according to embodiments of the present disclosure, the mother book server automatically rearranges the mother book online based on the request message of the child book client (for example, the size of a screen of the child book client) to generate a child book suitable for reading at the child book client, thus guaranteeing a clear display effect of the child book at various clients. The system according to the embodiments of the present disclosure also has an advantage of high adaptability.

Moreover, in embodiments of the present disclosure, since the child books in various child book clients 220 and the mother book have the unique and identical number, it can be guaranteed that the various child book clients 220 communicate and edit collaboratively regarding content of a certain page, such that the present system may be applied to distance education and provide great convenience for the distance education. In addition, the mother book server 210 can provide an editable or a non-editable child book to the child book client 220, and the authority of the child book client 220 can be managed by limiting the number of pages and content capacity of the mother book available to the child book client 220, thus protecting the copyright of the mother book and avoiding the occurrence of piracy. The mother book server 210 can generate a child book for the child book client 220 according to the customized information of the child book client 220, so as to satisfy the requirements of different users on the effect of reading the child book.

Figure 3:
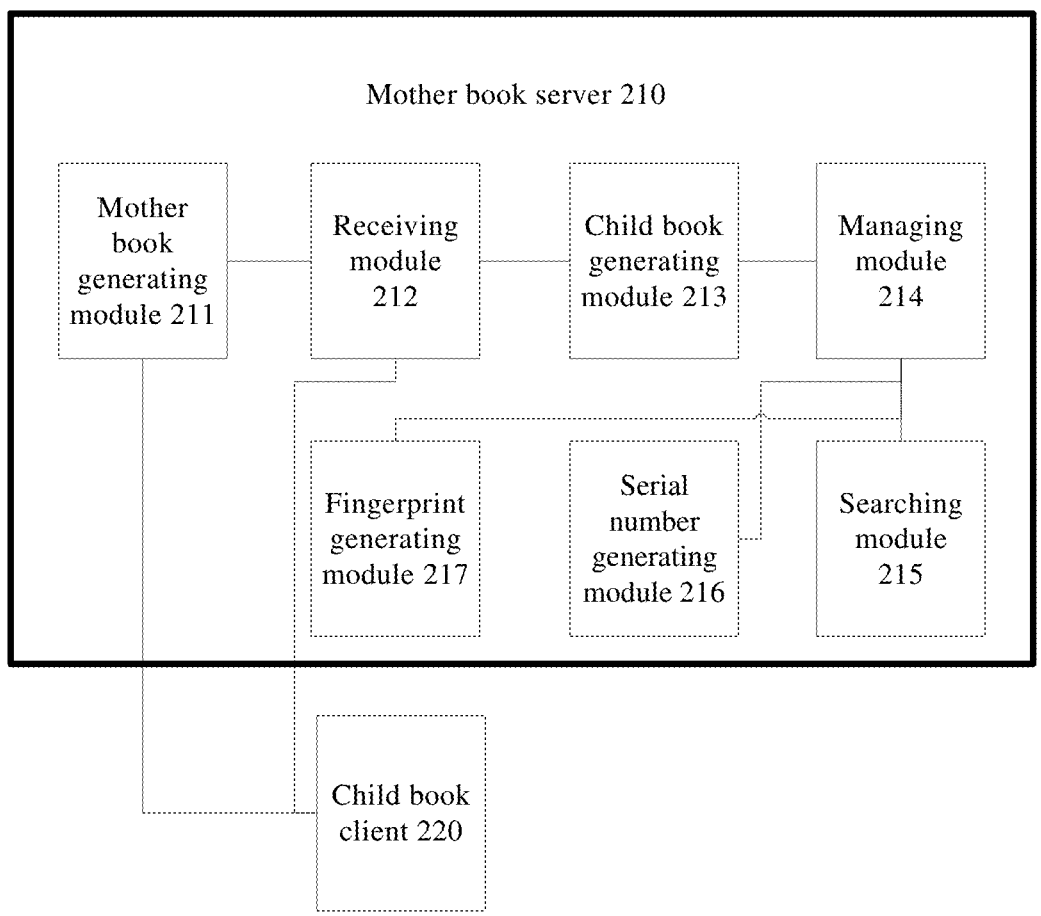
FIG. 3 is a block diagram of a mother book server according to an embodiment of the present disclosure.

FIG. 3 is a block diagram of a mother book server 210 according to an embodiment of the present disclosure. As shown in FIG. 3, the mother book server 210 includes a mother book generating module 211, a receiving module 212, a child book generating module 213 and a managing module 214.

The mother book generating module 211 is configured to generate a mother book. The receiving module 212 is configured to receive a request message transmitted by a child book client. The child book generating module 213 is configured to generate a corresponding child book for the child book client according to the request message and the mother book, and to transmit the child book to the child book client. The managing module 214 is configured to receive an operation request generated by the child book client according to an operation instruction of a user and a first position information of a content corresponding to the operation instruction in the mother book, and to transmit the content corresponding to the operation instruction to the child book client according to the first position information.

Specifically, the mother book server 210 is but not limited to a cloud server. In examples of the present disclosure, the mother book generating module 211 may generate the mother book in various manners. For example, the mother book generating module 211 generates the mother book according to a document compiled by the author. That is, the author compiles the document according to a designated format, and the mother book generating module 211 generates the mother book based on the compiled document. In this embodiment, the designated format is but not limited to a BDF format, and any other known formats can be employed.

In addition, the mother book generating module 211 can generate the mother book in the following way. Specifically, the mother book server includes a searching module 215 configured to perform a search according to a query transmitted by the child book client to obtain a plurality of search results, such that the mother book generating module 211 aggregates the plurality of search results to generate the mother book, in which the child book client 220 can be a smart phone, a tablet computer, a personal computer (PC), an electronic book reader, etc. For example, the searching module 215 has the function of a search engine or relies on an existing search engine, like Baidu search engine. The searching module 215 performs the search according to the query to obtain a plurality of search results, and aggregates the plurality of search results to generate the mother book.

In the above example, the mother book generating module 211 can extract resulting information from the plurality of search results and coverts the information into the mother book. Specifically, the searching module 215 receives the query transmitted by the child book client 220, and performs the search according to the query to obtain the plurality of search results. Then, the mother book generating module 211 can automatically aggregate the plurality of search results according to a correlation algorithm in the background, and generate an electronic document or an electronic book. In a specific example of the present disclosure, the correlation algorithm determines the correlation according to, for example, clicking on logs, or automatically removes repeated and irrelevant content (such as navigation bars on a webpage, copyright information at the bottom, etc.) using relevant and recommended entries from Baidupedia and Wikipedia.

Further, in the process of typesetting and generating the mother book, the mother book generating module 211 can employ a typesetting program, such as Xelatex typesetting program with open source codes, typesetting programs of Founder Bookmaker, Indesign typesetting programs from Aode, etc. The mother book generated is but not limited to in PDF format. In this process, the mother book generating module 211 stores typesetting information (for example, in the Xelatex typesetting program, the typesetting information is called reverse reference syntax file, i.e. it is able to jump to the typesetting source code by clicking the PDF). In this example, the mother book can include a zip package containing original webpage information, PDF and typesetting information, and the mother book is default to be in a standard format. The mother book is stored in the mother book generating module 211 for later proofreading, updating or citation.

In an embodiment of the present disclosure, the request message includes but is not limited to format information of the child book desired by the child book client 220, and the child book generating module 213 generates the corresponding child book for the child book client 220 according to the format information. In some embodiments of the present disclosure, the format information of the child book desired by the child book client 220 can be derived from the type or model of the child book client 220. For example, if the child book generating module 213 finds a mother book corresponding to the request message according to the request message, the child book generating module 213 generates a child book in the format requested in the request message based on the corresponding mother book. In the embodiment, the child book is generated in such a manner that the child book generating module 213 automatically rearranges the mother book online according to the type of the child book client 220. For example, for a smart phone and a tablet computer which are two different types of child book clients 220 and have different sizes of screens, the child book generating module 213 will automatically rearranges the mother book online based on the size of the screen to generate the child book suitable for reading at each type of child book client 220, so as to guarantee a clear display effect of the child book at each type of child book client 220. In other examples of the present disclosure, the child book generating module 213 can generate, in advance, the child books desired by the child book clients 220 commonly used at present, such that the child book generating module 213 can make a simple choice from the pre-generated child books according to the request message after the receiving module 212 receives the request message from the child book client 220.

In an embodiment of the present disclosure, the receiving module 212 receives the request message transmitted by the child book client 220, in which the request message can be transmitted to the receiving module 212 according to the instruction of the user after the user logs in a particular electronic book program. In embodiments of the present disclosure, the request message includes information for identifying the mother book, such as an identifier or a serial number corresponding to the mother book.

In some examples, the child book includes a child information file, such that the child book client 220 acquires the first position information of the content corresponding to the operation instruction in the mother book according to the child information file. The child information file is generated by the mother book server 210 while generating the child book based on the mother book. Further, the child information file records a second position information of a page of a content in the child book in the mother book. Specifically, the child book has one child information file, but different child books have different child information files, since different child books have different typesetting processes. For example, as for the Xelatex typesetting program, the child information file is called reverse reference syntax file, i.e. it is able to jump to the typesetting source code by clicking PDF. The child information file records the positions of pages of all the texts and pictures in the child book in the mother book, and the correspondences can be calculated by X-Y coordinate transformation. Thus, the managing module 214 may acquire the position of a certain page of the child book in the mother book according to the child information file of the child book.

For example, as for the process that the managing module 214 acquires the content corresponding to the operation instruction from the mother book server 210 according to the first position information, specifically, when the managing module 214 receives an instruction of duplicating the content of a certain page of the child book via the child book client 220, the content at the corresponding position in the mother book will be sent to the child book client 220 according to the position of the content in the mother book, so as to realize the operation of duplicating the content.

In an example of the present disclosure, the mother book server 210 further includes a serial number generating module 216 configured to generate a serial number corresponding to the mother book according to a content of the mother book. For example, the serial number generating module 216 subjects the content of the mother book to SHA-1 algorithm, and extracts the first N characters of a result from the SHA-1 algorithm as the above serial number, N being, for example, 12. It is known that each mother book corresponds to a unique number. Moreover, the mother book and the child book have identical serial numbers. Further, there are a plurality of child book clients 220, such as a mobile terminal, a tablet computer, a PC and an electronic book reader. In other words, the child books with the same number at various child book clients 220 correspond to the unique mother book. Thus, all the child book clients 220 with different screen sizes can communicate and edit collaboratively regarding content of a certain page, which may bring great convenience in specific applications such as distance education and distance learning. In addition, the child books are arranged individually for the child book clients 220 with different screen sizes, so as to guarantee a clear display effect of the child books individually arranged at various child book clients 220.

Further, the mother book server 210 further includes a fingerprint generating module 217 configured to generate fingerprint information corresponding to the mother book according to a part of the content of the mother book. For example, the fingerprint generating module 217 samples several content blocks in the mother book randomly, like five content blocks, and generates fingerprint information. The fingerprint information can be used for removal of repeated content and rapid anti-plagiarism regarding the mother book, so as to improve the quality of the mother book and avoid the occurrence of piracy, thus protecting the copyright of the mother book.

In order to further improve the protection of copyright of the mother book, the child book generating module 213 is further configured to select and transmit a protected format or a non-protected format of the child book to the child book client 220 according to the copyright protection information of the mother book. Specifically, after acquiring the copyright protection information of the mother book, the child book generating module 213 selects and transmits the protected format or non-protected format of the child book to the child book client 220 according to the copyright protection information. For example, if the author of the mother book has a relatively low requirement on protection level of the mother book, the child book generating module 213 can select the non-protected format of the child book and transmit the non-protected format of the child book to the child book client 220, in which the non-protected format of the child book may be a complete child book in PDF format, and the content thereof can be edited or duplicated. If the author of the mother book has a higher requirement on protection level of the mother book, the child book generating module 213 will print the mother book in PDF format into pictures for generating the child book, and transmits the child book to the child book client 220. In the embodiment, the format of the pictures is but not limited to PNG format or DJVU format. Hence, the copyright of the mother book can be protected in a high level, so as to protect the copyright of the mother book from infringement. Further, after the child book client 220 obtains the child book, it can be judged whether the format of the child book is original PDF or DRM-protected PDF (i.e. pictures). If the user demands to duplicate or search the protected PDF, the child book client 220 can calculate the position of the current page in the source code of the mother book according to the typesetting information file, and the child book generating module 213 can transmit the corresponding page of text to the child book.

In order to further protect the copyright of the mother book, the managing module 214 can be configured to acquire authority information of the child book client 220, and to manage the content acquired by the child book client 220 according to the authority information, in which the authority information contains page information of the mother book available to the child book client 220. For example, this can be achieved by logging in. In other words, the child book client 220 requires the user to log in. The logged-in users are classified—different classes of users have different levels of authority that correspond to different authority scopes, such that each logged-in user can only request for the number of pages within the authority scope, and cannot request for text from the mother book continuously, i.e. cannot request for text from the mother book repeatedly, otherwise the copyright protection cannot be fulfilled.

In addition, the authority information also includes content capacity information of the mother book available to the child book client 220. Specifically, for instance, the content capacity information of the mother book available to the child book client 220 cannot exceed 50% of the total content information of the mother book. Specifically, the managing module 214 records a request volume of all the child book clients 220 for the protected content, and if the request volume has exceeded the predetermined value (like 50%), the child book client 220 will be locked. When the child book client 220 is locked, only the search function may be provided for the child book client 220 but the functions of duplicating or copying new pages are limited. Therefore, the copyright protection of the mother book is further enhanced.

In an embodiment of the present disclosure, the child book generating module 213 is further configured to generate a corresponding child book for the child book client according to customized information sent by the child book client. Specifically, the child book client 220 receives the customized information from the user and sends the customized information to the child book generating module 213 of the mother book server 210, and the child book generating module 213 generates the child book for the child book client 220 according to the customized information. In the embodiment, the customized information includes but is not limited to font size or customized format. That is, the child book client 220 can send a command about the font size or customized format to the child book generating module 213, and if the child book generating module 213 verifies that the child book client 220 is authorized, the child book generating module 213 rearranges the child book and sends the rearranged child book to the child book client 220.

The mother book server according to the embodiments of the present disclosure can automatically rearranges the mother book online based on the request message from the child book client (for example, the size of a screen of the child book client) to generate a child book suitable for reading at the child book client, thus guaranteeing a clear display effect of the child book at various clients. In addition, the mother book server according to the embodiments of the present disclosure also has an advantage of high adaptability.

Moreover, in embodiments of the present disclosure, since the child books in various child book clients 220 and the mother book have the unique and identical number, it can be guaranteed that the various child book clients 220 communicate and edit collaboratively regarding content of a certain page, such that the present mother book server may be applied to distance education and may provide great convenience for the distance education. In addition, the mother book server 210 can provide an editable or a non-editable child book to the child book client 220, and the authority of the child book client 220 can be managed by limiting the number of pages and content capacity of the mother book available to the child book client 220, thus protecting the copyright of the mother book and avoiding the occurrence of piracy. The mother book server 210 can also generate a child book for the child book client 220 according to the customized information of the child book client 220, so as to satisfy the requirements of different users on the effect of reading the child book.

Figure 4:
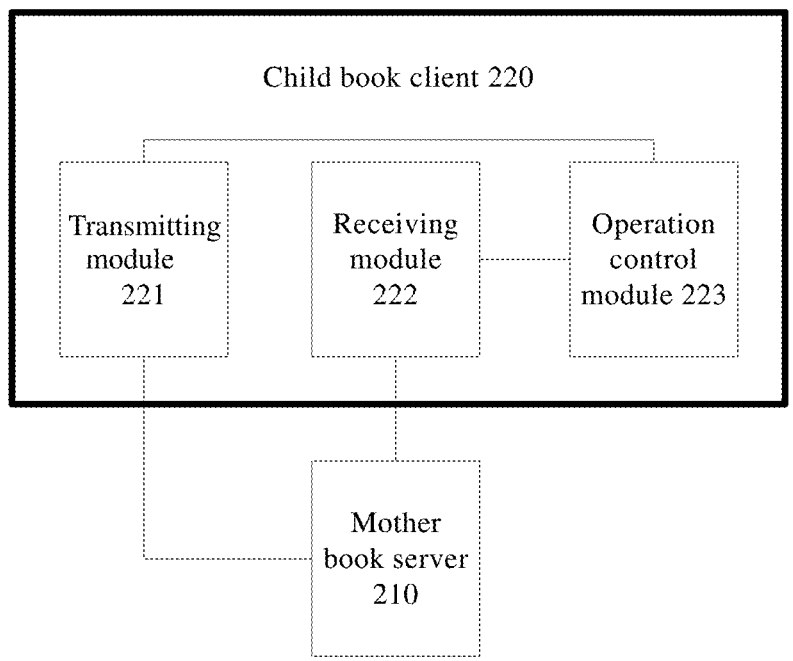
FIG. 4 is a block diagram of a child book client according to an embodiment of the present disclosure.

FIG. 4 is a block diagram of a child book client according to an embodiment of the present disclosure. As shown in FIG. 4, the child book client 220 according to an embodiment of the present disclosure includes a transmitting module 221, a receiving module 222 and an operation control module 223.

The transmitting module 221 is configured to transmit a request message to a mother book server. The receiving module 222 is configured to receive a child book generated by the mother book server according to the request message and a mother book in the mother book server. The operation control module 223 is configured to receive an operation instruction of a user, to acquire a first position information of a content corresponding to the operation instruction in the mother book, and to obtain the content corresponding to the operation instruction in the mother book server according to the first position information.

Specifically, the mother book server 210 is but not limited to a cloud server. In examples of the present disclosure, the mother book server 210 may generate the mother book in various manners. For example, the mother book server 210 generates the mother book according to a document compiled by the author. That is, the author compiles the document according to a designated format, and the mother book server 210 generates the mother book based on the compiled document. In this embodiment, the designated format is but not limited to a BDF format, and any other known formats can be employed.

In addition, the mother book server 210 can generate the mother book in the following way. Specifically, the mother book server 210 receives a query transmitted by the child book client 220 which can be a smart phone, a tablet computer, a personal computer (PC), an electronic book reader, etc. For example, the mother book server 210 has the function of a search engine or relies on an existing search engine, like Baidu search engine. The mother book server 210 performs a search according to the query to obtain a plurality of search results, and aggregates the plurality of search results to generate the mother book.

In the above example, the mother book server 210 can extract resulting information from the plurality of search results and coverts the information into the mother book. Specifically, the mother book server 210 receives the query transmitted by the child book client 220, and the mother book server 210 performs the search according to the query to obtain the plurality of search results. Meanwhile, the mother book server 210 can automatically aggregate the plurality of search results according to a correlation algorithm in the background, and generate an electronic document or an electronic book. In a specific example of the present disclosure, the correlation algorithm determines the correlation according to, for example, clicking on logs, or automatically removes repeated and irrelevant content (such as navigation bars on a webpage, copyright information at the bottom, etc.) using relevant and recommended entries from Baidupedia and Wikipedia.

Further, in the process of typesetting and generating the mother book, the mother book server 210 can employ a typesetting program, such as Xelatex typesetting program with open source codes, typesetting programs of Founder Bookmaker, Indesign typesetting programs from Aode, etc. The mother book generated is but not limited to in PDF format. In this process, the mother book server 210 stores typesetting information (for example, in the Xelatex typesetting program, the typesetting information is called reverse reference syntax file, i.e. it is able to jump to the typesetting source code by clicking the PDF). In this example, the mother book can include a zip package containing original webpage information, PDF and typesetting information, and the mother book is default to be in a standard format. The mother book is stored in the mother book server 210 for later proofreading, updating or citation.

In an embodiment of the present disclosure, the request message includes but is not limited to format information of the child book desired by the child book client 220, and the mother book server 210 generates the corresponding child book for the child book client 220 according to the format information. In some embodiments of the present disclosure, the format information of the child book desired by the child book client 220 can be derived from the type or model of the child book client 220. For example, if the mother book server 210 finds a mother book corresponding to the request message according to the request message, the mother book server 210 generates a child book in the format requested in the request message based on the corresponding mother book. In the embodiment, the child book is generated in such a manner that the mother book server 210 automatically rearranges the mother book online according to the type of the child book client 220. For example, for a smart phone and a tablet computer which are two different types of child book clients 220 and have different sizes of screens, the mother book server 210 will automatically rearranges the mother book online based on the size of the screen to generate the child book suitable for reading at each type of child book client 220, so as to guarantee a clear display effect of the child book at each type of child book client 220. In other examples of the present disclosure, the mother book server 210 can generate, in advance, the child books desired by commonly used the child book clients 220, such that the mother book server 210 can make a simple choice from the pre-generated child books according to the request message after receiving the request message from the child book client 220.

In an embodiment of the present disclosure, the transmitting module 221 of the child book client 220 transmits a request message to the mother book server 210, in which the request message can be transmitted to the mother book server 210 according to the instruction of the user after the user logs in a particular electronic book program. In embodiments of the present disclosure, the request message includes information for identifying the mother book, such as an identifier or a serial number corresponding to the mother book.

In some examples, the child book includes a child information file, and the operation control module 223 acquires the first position information of the content corresponding to the operation instruction in the mother book according to the child information file. The child information file is generated by the mother book server 210 while generating the child book based on the mother book. Further, the child information file records a second position information of a page of a content in the child book in the mother book. Specifically, the child book has one child information file, but different child books have different child information files, since different child books have different typesetting processes. For example, as for the Xelatex typesetting program, the child information file can be called reverse reference syntax file, i.e. it is able to jump to the typesetting source code by clicking PDF. The child information file records the positions of pages of all the texts and pictures in the child book in the mother book, and the correspondences can be calculated by X-Y coordinate transformation. Thus, the mother book server 210 may acquire the position of a certain page of the child book in the mother book according to the child information file of the child book.

For example, as for the process that the mother book server 210 acquires the content corresponding to the operation instruction from the mother book server 210 according to the first position information, specifically, when the mother book server 210 receives an instruction of duplicating the content of a certain page of the child book via the child book client 220, the content at the corresponding position in the mother book will be sent to the child book client 220 according to the position of the content in the mother book, so as to realize the operation of duplicating the content.

In an example of the present disclosure, the mother book has a serial number generated according to a content thereof. Specifically, the mother book server 210 can generate a serial number corresponding to the mother book according to the content of the mother book. For example, the mother book server 210 subjects the content of the mother book to SHA-1 algorithm, and extracts the first N characters of a result from the SHA-1 algorithm as the above serial number, N being, for example, 12. It is known that each mother book corresponds to a unique number. Moreover, the mother book and the child book have identical serial numbers. Further, there are a plurality of child book clients 220, such as a mobile terminal, a tablet computer, a PC and an electronic book reader. In other words, the child books with the same number at various child book clients 220 correspond to the unique mother book. Thus, all the child book clients 220 with different screen sizes can communicate and edit collaboratively regarding content of a certain page, which may bring great convenience in specific applications such as distance education and distance learning. In addition, the child books are arranged individually for the child book clients 220 with different screen sizes, so as to guarantee a clear display effect of the child book individually arranged at various child book clients 220.

Further, the mother book server 210 can be configured to generate fingerprint information corresponding to the mother book according to a part of the content of the mother book. For example, the mother book server 210 samples several content blocks in the mother book randomly, like five content blocks, and generates fingerprint information. The fingerprint information can be used for removal of repeated content and rapid anti-plagiarism regarding the mother book, so as to improve the quality of the mother book and avoid the occurrence of piracy, thus protecting the copyright of the mother book.

In order to further improve the protection of copyright of the mother book, the mother book server 210 acquires the copyright protection information of the mother book, selects and transmits a protected format or a non-protected format of the child book to the child book client 220 according to the copyright protection information of the mother book. For example, if the author of the mother book has a relatively low requirement on protection level of the mother book, the mother book server 210 can select the non-protected format of the child book and transmit it to the child book client 220, in which the non-protected format of the child book may be a complete child book in PDF format, and the content thereof can be edited or duplicated. If the author of the mother book has a higher requirement on protection level of the mother book, the mother book server 210 will print the mother book in PDF format into pictures for generating the child book, and transmits the child book to the child book client 220. In the embodiment, the format of the pictures is but not limited to PNG format or DJVU format. Hence, the copyright of the mother book can be protected in a high level, so as to protect the copyright of the mother book from infringement. Further, after the child book client 220 obtains the child book, it can be judged whether the format of the child book is original PDF or DRM-protected PDF (i.e. pictures). If the user demands to duplicate or search the protected PDF, the child book client 220 can calculate the position of the current page in the source code of the mother book according to the typesetting information file, and the mother book server 210 can transmit the corresponding page of text to the child book.

In order to further protect the copyright of the mother book, the mother book server 210 can be configured to acquire authority information of the child book client 220, and to manage the content acquired by the child book client 220 according to the authority information, in which the authority information contains page information of the mother book available to the child book client 220. For example, this can be achieved by logging in. In other words, the child book client 220 requires the user to log in. The logged-in users are classified—different classes of users have different levels of authority that correspond to different authority scopes, such that each logged-in user can only request for the number of pages within the authority scope, and cannot request for text from the mother book continuously, i.e. cannot request for text from the mother book repeatedly, otherwise the copyright protection cannot be fulfilled.

In addition, the authority information also includes content capacity information of the mother book available to the child book client 220. Specifically, for instance, the content capacity information of the mother book available to the child book client 220 cannot exceed 50% of the total content information of the mother book. Specifically, the mother book server 210 records a request volume of all the child book clients 220 for the protected content, and if the request volume has exceeded the predetermined value (like 50%), the child book client 220 will be locked. When the child book client 220 is locked, only the search function may be provided for the child book client 220 but the functions of duplicating or copying new pages are limited. Therefore, the copyright protection of the mother book is further enhanced.

In an embodiment of the present disclosure, the child book client 220 is further configured to receive customized information of the user and send the customized information to the mother book server 210, and the mother book server 210 generates the child book for the child book client 220 according to the customized information. In the embodiment, the customized information includes but is not limited to font size or customized format. That is, the child book client 220 can send a command about the font size or customized format to the mother book server 210, and if the mother book server 210 verifies that the child book client 220 is authorized, the child book is rearranged and sent to the child book client 220.

The child book client according to the embodiments of the present disclosure can transmit the request message to the mother book server, such that the mother book server automatically rearranges the mother book online based on the request message (for example, the size of a screen of the child book client) to generate a child book suitable for reading at the child book client, thus guaranteeing a clear display effect of the child book at various clients. The child book client according to the embodiments of the present disclosure can include various types of clients, such as a PC, a smart phone, a tablet computer and an electronic book reader, and have an advantage of high adaptability.

Moreover, in embodiments of the present disclosure, since the child books in various child book clients 220 and the mother book have the unique and identical number, it can be guaranteed that the various child book clients 220 communicate and edit collaboratively regarding content of a certain page, such that the child book client 220 may be applied to distance education and may provide great convenience for the distance education. In addition, the mother book server 210 can provide an editable or a non-editable child book to the child book client 220 according to the authority of the child book client, and the authority of the child book client 220 can be managed by limiting the number of pages and content capacity of the mother book available to the child book client 220, thus protecting the copyright of the mother book and avoiding the occurrence of piracy. Furthermore, the child book client can transmit customized information to the mother book server, such that the mother book server generates a child book for the child book client according to the customized information of the child book client, thus satisfying the requirements of different users on the effect of reading the child book.

Figure 5:
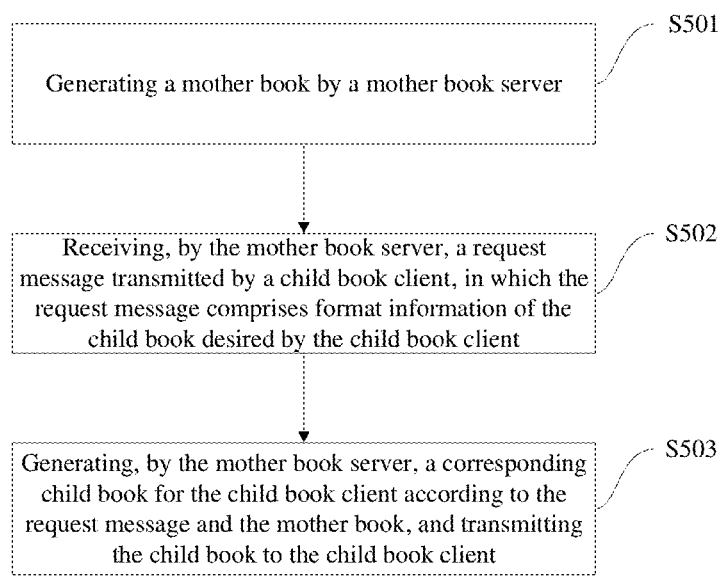
FIG. 5 is a flow chart of a method for providing an electronic document according to another embodiment of the present disclosure.

FIG. 5 is a flow chart of a method for providing an electronic document according to another embodiment of the present disclosure. As shown in FIG. 5, the method includes the following steps.

In step 501, the mother book server generates the mother book. The mother book server is but not limited to a cloud server. In examples of the present disclosure, the mother book server may generate the mother book in various manners. For example, the mother book server generates the mother book according to a document compiled by the author. That is, the author compiles the document according to a designated format, and the mother book server generates the mother book based on the compiled document. In this embodiment, the designated format is but not limited to a BDF format, and any other known formats can be employed.

In addition, the embodiments of the present disclosure further provide another method for generating the mother book. Specifically, the method includes the following steps.

In step S1, the mother book server receives a query transmitted by the child book client. The child book client can be a smart phone, a tablet computer, a personal computer (PC), an electronic book reader, etc. For example, the mother book server has the function of a search engine or relies on an existing search engine, like Baidu search engine.

In step S2, the mother book server performs a search according to the query to obtain a plurality of search results.

In steps S3, the mother book server aggregates the plurality of search results to generate the mother book.

In embodiments of the present disclosure, the mother book server can extract resulting information from the plurality of search results and coverts the information into the mother book. Specifically, the mother book server receives the query transmitted by the child book client, and the mother book server performs the search according to the query to obtain the plurality of search results. Meanwhile, the mother book server can automatically aggregate the plurality of search results according to a correlation algorithm in the background, and generate an electronic document or an electronic book. In a specific example of the present disclosure, the correlation algorithm determines the correlation according to, for example, clicking on logs, or automatically removes repeated and irrelevant content (such as navigation bars on a webpage, copyright information at the bottom, etc.) using relevant and recommended entries from Baidupedia and Wikipedia.

Further, in the process of typesetting and generating the mother book, the mother book server can employ a typesetting program, such as Xelatex typesetting program with open Source codes, typesetting programs of Founder Bookmaker, Indesign typesetting programs from Aode, etc. The mother book generated is but not limited to in PDF format. In this process, the mother book server stores typesetting information (for example, in the Xelatex typesetting program, the typesetting information is called reverse reference syntax file, i.e. it is able to jump to the typesetting source code by clicking the PDF). In this example, the mother book can include a zip package containing original webpage information, PDF and typesetting information, and the mother book is default to be in a standard format. The mother book is stored in the mother book server for later proofreading, updating or citation.

In step 502, the mother book server receives a request message transmitted by the child book client, in which the request message contains format information of the child book desired by the child book client. Specifically, the request message can be transmitted to the mother book server according to an instruction of the user after the user logs in a particular electronic book program. In embodiments of the present disclosure, the request message includes information for identifying the mother book, such as an identifier or a serial number corresponding to the mother book.

In step 503, the mother book server generates a corresponding child book for the child book client according to the request message and the mother book, and transmits the child book to the child book client.

In the embodiment, the request message includes but is not limited to format information of the child book desired by the child book client, and the mother book server generates the corresponding child book for the child book client according to the format information. In some embodiments of the present disclosure, the format information of the child book desired by the child book client can be derived from the type or model of the child book client. For example, if the mother book server finds a mother book corresponding to the request message according to the request message, the mother book server generates a child book in the format requested in the request message based on the corresponding mother book. In the embodiment, the child book is generated in such a manner that the mother book server automatically rearranges the mother book online according to the type of the child book client. For example, for a smart phone and a tablet computer which are two different types of child book clients and have different sizes of screens, the mother book server will automatically rearranges the mother book online based on the size of the screen to generate the child book suitable for reading at each type of child book client, so as to guarantee a clear display effect of the child book at each type of child book client. In other examples of the present disclosure, the mother book server can generate, in advance, the child books desired by the child book clients commonly used at present, such that the mother book server can make a simple choice from the pre-generated child books according to the request message after receiving the request message from the child book client.

In an example of the present disclosure, the method further includes: generating, by the mother book server, a serial number corresponding to the mother book according to a content of the mother book. For example, the mother book server subjects the content of the mother book to SHA-1 algorithm, and extracts the first N characters of a result from the SHA-1 algorithm as the above serial number, N being, for example, 12. It is known that each mother book corresponds to a unique number. Moreover, the mother book and the child book have identical serial numbers. Further, there are a plurality of child book clients, such as a mobile terminal, a tablet computer, a PC and an electronic book reader. In other words, the child books with the same number at various child book clients correspond to the unique mother book. Thus, all the child book clients with different screen sizes can communicate and edit collaboratively regarding content of a certain page, which may bring great convenience in specific applications such as distance education and distance learning. In addition, the child books are arranged individually for the child book clients with different screen sizes, so as to guarantee a clear display effect of the child book individually arranged at various child book clients.

Further, the method according to embodiments of the present disclosure further includes: generating, by the mother book server, fingerprint information corresponding to the mother book according to a part of the content of the mother book. For example, the mother book server samples several content blocks in the mother book randomly, like five content blocks, and generates fingerprint information.

The fingerprint information can be used for removal of repeated content and rapid anti-plagiarism regarding the mother book, so as to improve the quality of the mother book and avoid the occurrence of piracy, thus protecting the copyright of the mother book.

In order to further improve the protection of copyright of the mother book, the mother book server acquires the copyright protection information of the mother book. The mother book server selects and transmits a protected format or a non-protected format of the child book to the child book client according to the copyright protection information of the mother book. For example, if the author of the mother book has a relatively low requirement on protection level of the mother book, the mother book server can select the non-protected format of the child book and transmit the non-protected format of the child book to the child book client, in which the non-protected format of the child book may be a complete child book in PDF format, and the content thereof can be edited or duplicated. If the author of the mother book has a higher requirement on protection level of the mother book, the mother book server will print the mother book in PDF format into pictures for generating the child book, and transmits the child book to the child book client. In the embodiment, the format of the pictures is but not limited to PNG format or DJVU format. Hence, the copyright of the mother book can be protected in a high level, so as to protect the copyright of the mother book from infringement. Further, after the child book client obtains the child book, it can be judged whether the format of the child book is original PDF or DRM-protected PDF (i.e. pictures). If the user demands to duplicate or search the protected PDF, the child book client can calculate the position of the current page in the source code of the mother book according to the typesetting information file, and the mother book server can transmit the corresponding page of text to the child book.

In order to further protect the copyright of the mother book, the method further includes: acquiring authority information of the child book client by the mother book server; managing, by the mother book server, the content acquired by the child book client according to the authority information, in which the authority information contains page information of the mother book available to the child book client. For example, this can be achieved by logging in. In other words, the child book client requires the user to log in. The logged-in users are classified—different classes of users have different levels of authority that correspond to different authority scopes, such that each logged-in user can only request for the number of pages within the authority scope, and cannot request for text from the mother book continuously, i.e. cannot request for text from the mother book repeatedly, otherwise the copyright protection cannot be fulfilled.

In addition, the authority information also includes content capacity information of the mother book available to the child book client. Specifically, for instance, the content capacity information of the mother book available to the child book client cannot exceed 50% of the total content information of the mother book. Specifically, the mother book server records a request volume of all the child book clients for the protected content, and if the request volume has exceeded the predetermined value (like 50%), the child book client will be locked. When the child book is locked, only the search function may be provided for the child book client, but the functions of duplicating or copying new pages are limited. Therefore, the copyright protection of the mother book is further enhanced.

In an embodiment of the present disclosure, the method further includes: receiving customized information by the child book client, and sending the customized information to the mother book server by the child book client; and generating the child book for the child book client by the mother book server according to the customized information. In the embodiment, the customized information includes but is not limited to font size or customized format. That is, the child book client can send a command about the font size or customized format to the mother book server, and if the mother book server verifies that the child book client is authorized, the child book is rearranged and sent to the child book client.

With the method for providing an electronic document according to embodiments of the present disclosure, the mother book server automatically rearranges the mother book online based on the request message from the child book client (for example, the size of a screen of the child book client) to generate a child book suitable for reading at the child book client, so as to guarantee a clear display effect of the child book at various client. The method according to the embodiments of the present disclosure also has an advantage of high adaptability.

Figure 6:
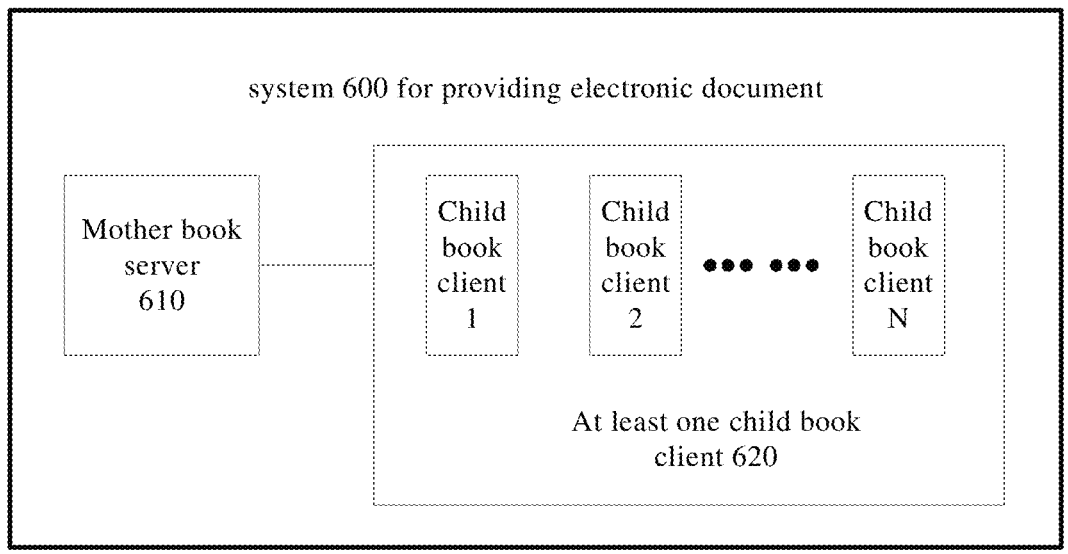
FIG. 6 is a block diagram of a system for providing an electronic document according to another embodiment of the present disclosure.

FIG. 6 is a block diagram of a system for providing an electronic document according to an embodiment of the present disclosure. As shown in FIG. 6, a system 600 for providing an electronic document according to an embodiment of the present disclosure includes a mother book server 610 and at least one child book client 620.

The at least one child book client 620 is configured to transmit a request message to the mother book server, in which the request message includes format information of the child book desired by the child book client. The mother book server 610 is configured to generate a mother book, to generate a corresponding child book for the child book client 620 according to the request message and the mother book, and to transmit the child book to the child book client 620.

Specifically, the mother book server 610 is but not limited to a cloud server. In examples of the present disclosure, the mother book server 610 may generate the mother book in various manners. For example, the mother book server 610 generates the mother book according to a document compiled by the author. That is, the author compiles the document according to a designated format, and the mother book server 610 generates the mother book based on the compiled document. In this embodiment, the designated format is but not limited to a BDF format, and any other known formats can be employed.

In addition, the mother book server 610 can generate the mother book in the following way. Specifically, the mother book server 610 receives a query transmitted by the child book client 620. There may be a plurality of child book clients 620, for example, including a smart phone, a tablet computer, a personal computer (PC), an electronic book reader, etc. For example, the mother book server 610 has the function of a search engine or relies on an existing search engine, like Baidu search engine. The mother book server 610 performs a search according to the query to obtain a plurality of search results, and aggregates the plurality of search results to generate the mother book.

In the above example, the mother book server 610 can extract resulting information from the plurality of search results and coverts the information into the mother book. Specifically, the mother book server 610 receives the query transmitted by the child book client 620, and the mother book server 610 performs the search according to the query to obtain the plurality of search results. Meanwhile, the mother book server 610 can automatically aggregate the plurality of search results according to a correlation algorithm in the background, and generate an electronic document or an electronic book. In a specific example of the present disclosure, the correlation algorithm determines the correlation according to, for example, clicking on logs, or automatically removes repeated and irrelevant content (such as navigation bars on a webpage, copyright information at the bottom, etc.) using relevant and recommended entries from Baidupedia and Wikipedia.

Further, in the process of typesetting and generating the mother book, the mother book server 610 can employ a typesetting program, such as Xelatex typesetting program with open source codes, typesetting programs of Founder Bookmaker, Indesign typesetting programs from Aode, etc. The mother book generated is but not limited to in PDF format. In this process, the mother book server 610 stores typesetting information (for example, in the Xelatex typesetting program, the typesetting information can be called reverse reference syntax file, i.e. being able to jump to the typesetting source code by clicking the PDF). In this example, the mother book can include a zip package containing original webpage information, PDF and typesetting information, and the mother book is default to be in a standard format. The mother book is stored in the mother book server 610 for later proofreading, updating or citation.

In an embodiment of the present disclosure, the request message includes but is not limited to format information of the child book desired by the child book client 620, and the mother book server 610 generates the corresponding child book for the child book client 620 according to the format information. In some embodiments of the present disclosure, the format information of the child book desired by the child book client 620 can be derived from the type or model of the child book client 620. For example, if the mother book server 610 finds a mother book corresponding to the request message according to the request message, the mother book server 610 generates a child book in the format requested in the request message based on the corresponding mother book. In the embodiment, the child book is generated in such a manner that the mother book server 610 automatically rearranges the mother book online according to the type of the child book client 620. For example, for a smart phone and a tablet computer which are two different types of child book clients 220 and have different sizes of screens, the mother book server 610 will automatically rearrange the mother book online based on the size of the screen to generate the child book suitable for reading at each type of child book client 620, so as to guarantee a clear display effect of the child book at each type of child book client 620. In other examples of the present disclosure, the mother book server 610 can generate, in advance, the child books desired by the child book clients 220 commonly used at present, such that the mother book server 610 can make a simple choice from the pre-generated child books according to the request message after receiving the request message from the child book client 620.

In an embodiment of the present disclosure, the child book client 620 transmits a request message to the mother book server 610, in which the request message can be transmitted to the mother book server 610 according to the instruction of the user after the user logs in a particular electronic book program. In the embodiments of the present disclosure, the request message includes information for identifying the mother book, such as an identifier or a serial number corresponding to the mother book.

In some examples, the child book includes a child information file, and the child book client 620 acquires the first position information of the content corresponding to the operation instruction in the mother book according to the child information file. The child information file is generated by the mother book server 610 while generating the child book based on the mother book. Further, the child information file records a second position information of a page of a content in the child book in the mother book. Specifically, the child book has one child information file, but different child books have different child information files, since different child books have different typesetting processes. For example, as for the Xelatex typesetting program, the child information file can be called reverse reference syntax file, i.e. being able to jump to the typesetting source code by clicking PDF. The child information file records the positions of pages of all the texts and pictures in the child book in the mother book, and the correspondences can be calculated by X-Y coordinate transformation. Thus, the mother book server 610 may acquire the position of a certain page of the child book in the mother book according to the child information file of the child book.

For example, as for the process that the mother book server 610 acquires the content corresponding to the operation instruction from the mother book server 610 according to the first position information, specifically, when the mother book server 610 receives an instruction of duplicating the content of a certain page of the child book via the child book client 620, the content at the corresponding position in the mother book will be sent to the child book client 620 according to the position of the content in the mother book, so as to realize the operation of duplicating the content.

In an example of the present disclosure, the mother book server 610 can generate a serial number corresponding to the mother book according to a content of the mother book. For example, the mother book server 610 subjects the content of the mother book to SHA-1 algorithm, and extracts the first N characters of a result from the SHA-1 algorithm as the above serial number, N being, for example, 12. It is known that each mother book corresponds to a unique number. Moreover, the mother book and the child book have identical serial numbers. Further, there are a plurality of child book clients 620, such as a mobile terminal, a tablet computer, a PC and an electronic book reader. In other words, the child books with the same number at various child book clients 620 correspond to the unique mother book. Thus, all the child book clients 620 with different screen sizes can communicate and edit collaboratively regarding content of a certain page, which may bring great convenience in specific applications such as distance education and distance learning. In addition, the child books are arranged individually for the child book clients 620 with different screen sizes, so as to guarantee a clear display effect of the child book individually arranged at various child book clients 620.

Further, the mother book server 610 can be configured to generate fingerprint information corresponding to the mother book according to a part of the content of the mother book. For example, the mother book server 610 samples several content blocks in the mother book randomly, like five content blocks, and generates fingerprint information. The fingerprint information can be used for removal of repeated content and rapid anti-plagiarism regarding the mother book, so as to improve the quality of the mother book and avoid the occurrence of piracy, thus protecting the copyright of the mother book.

In order to further improve the protection of copyright of the mother book, the mother book server 610 acquires the copyright protection information of the mother book, selects and transmits a protected format or a non-protected format of the child book to the child book client 620 according to the copyright protection information of the mother book. For example, if the author of the mother book has a relatively low requirement on protection level of the mother book, the mother book server 610 can select the non-protected format of the child book and transmit it to the child book client 620, in which the non-protected format of the child book may be a complete child book in PDF format, and the content thereof can be edited or duplicated. If the author of the mother book has a higher requirement on protection level of the mother book, the mother book server 610 will print the mother book in PDF format into pictures for generating the child book, and transmits the child book to the child book client 620. In the embodiment, the format of the pictures is but not limited to PNG format or DJVU format. Hence, the copyright of the mother book can be protected in a high level, so as to protect the copyright of the mother book from infringement. Further, after the child book client 620 obtains the child book, it can be judged whether the format of the child book is original PDF or DRM-protected PDF (i.e. pictures). If the user demands to duplicate or search the protected PDF, the child book client 620 can calculate the position of the current page in the source code of the mother book according to the typesetting information file, and the mother book server 610 can transmit the corresponding page of text to the child book.

In order to further protect the copyright of the mother book, the mother book server 610 can be configured to acquire authority information of the child book client 620, and to manage the content acquired by the child book client 620 according to the authority information, in which the authority information contains page information of the mother book available to the child book client 620. For example, this can be achieved by logging in. In other words, the child book client 620 requires the user to log in. The logged-in users are classified—different classes of users have different levels of authority that correspond to different authority scopes, such that each logged-in user can only request for the number of pages within the authority scope, and cannot request for text from the mother book continuously, i.e. cannot request for text from the mother book repeatedly, otherwise the copyright protection cannot be fulfilled.

In addition, the authority information includes content capacity information of the mother book available to the child book client 620. Specifically, for instance, the content capacity information of the mother book available to the child book client 620 cannot exceed 50% of the total content information of the mother book. Specifically, the mother book server 610 records a request volume of all the child book clients 220 for the protected content, and if the request volume has exceeded the predetermined value (like 50%), the child book client 620 will be locked. When the child book client 620 is locked, only the search function may be provided for the child book client 620 but the functions of duplicating or copying new pages are limited. Therefore, the copyright protection of the mother book is further enhanced.

In an embodiment of the present disclosure, the child book client 620 is further configured to receive customized information of the user and send the customized information to the mother book server 610, and the mother book server 610 is configured to generate the child book for the child book client 620 according to the customized information. In the embodiment, the customized information includes but is not limited to font size or customized format. That is, the child book client 620 can send a command about the font size or customized format to the mother book server 610, and if the mother book server 610 verifies that the child book client 620 is authorized, the child book is rearranged and sent to the child book client 620.

With the system for providing an electronic document according to the embodiments of the present disclosure, the mother book server automatically rearranges the mother book online based on the request message from the child book client (for example, the size of a screen of the child book client) to generate a child book suitable for reading at the child book client, so as to guarantee a clear display effect of the child book at various clients. The system according to the embodiments of the present disclosure also has an advantage of high adaptability.

Figure 7:
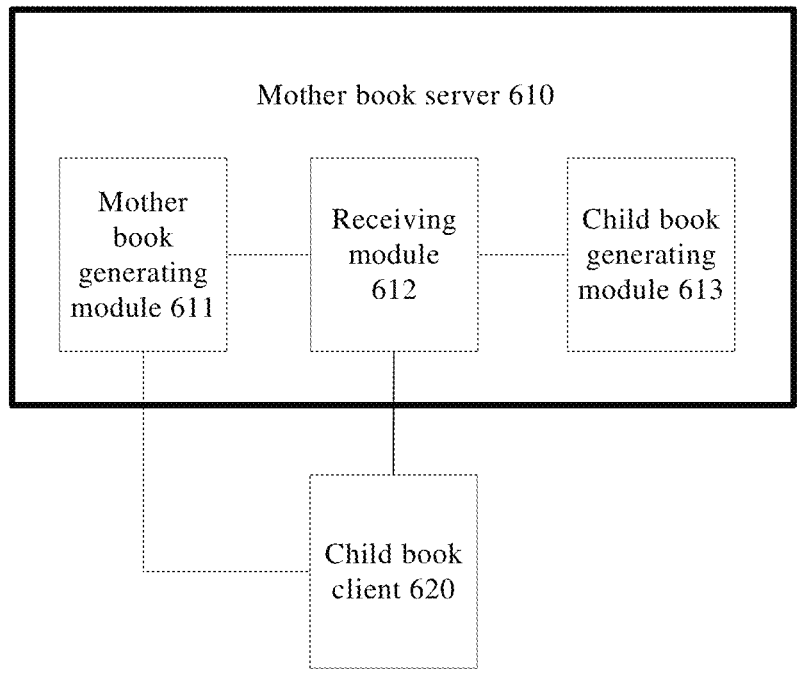
FIG. 7 is a block diagram of a mother book server according to another embodiment of the present disclosure.

FIG. 7 is a block diagram of a mother book server 610 according to an embodiment of the present disclosure. As shown in FIG. 7, the mother book server 610 includes a mother book generating module 611, a receiving module 612 and a child book generating module 613.

The mother book generating module 611 is configured to generate a mother book. The receiving module 612 is configured to receive a request message transmitted by a child book client, in which the request message includes format information of the child book desired by the child book client 620. The child book generating module 613 is configured to generate a corresponding child book for the child book client 620 according to the request message and the mother book, and to transmit the child book to the child book client 620.

Specifically, the mother book server 610 is but not limited to a cloud server. In examples of the present disclosure, the mother book generating module 611 may generate the mother book in various manners. For example, the mother book generating module 611 generates the mother book according to a document compiled by the author. That is, the author compiles the document according to a designated format, and the mother book generating module 611 generates the mother book based on the compiled document. In this embodiment, the designated format is but not limited to a BDF format, and any other known formats can be employed.

In addition, the mother book generating module 611 can generate the mother book in the following way. Specifically, the mother book server 610 is configured to perform a search according to a query transmitted by the child book client to obtain a plurality of search results, such that the mother book generating module 611 aggregates the plurality of search results to generate the mother book, in which the child book client 620 can be a smart phone, a tablet computer, a personal computer (PC), an electronic book reader, etc. For example, the mother book server 610 has the function of a search engine or relies on an existing search engine, like Baidu search engine. The mother book server 610 performs the search according to the query to obtain a plurality of search results, and aggregates the plurality of search results to generate the mother book.

In the above example, the mother book generating module 611 can extract resulting information from the plurality of search results and coverts the information into the mother book. Specifically, the mother book server 610 receives the query transmitted by the child book client 620, and performs the search according to the query to obtain the plurality of search results. Then, the mother book generating module 611 can automatically aggregate the plurality of search results according to a correlation algorithm in the background, and generate an electronic document or an electronic book. In a specific example of the present disclosure, the correlation algorithm determines the correlation according to, for example, clicking on logs, or the correlation algorithm automatically removes repeated and irrelevant content (such as navigation bars on a webpage, copyright information at the bottom, etc.) using relevant and recommended entries from Baidupedia and Wikipedia.

Further, in the process of typesetting and generating the mother book, the mother book generating module 611 can employ a typesetting program, such as Xelatex typesetting program with open source codes, typesetting programs of Founder Bookmaker, Indesign typesetting programs from Aode, etc. The mother book generated is but not limited to in PDF format. In this process, the mother book generating module 611 stores typesetting information (for example, in the Xelatex typesetting program, the typesetting information can be called reverse reference syntax file, i.e. being able to jump to the typesetting source code by clicking the PDF). In this example, the mother book can include a zip package containing original webpage information, PDF and typesetting information, and the mother book is default to be in a standard format. The mother book is stored in the mother book generating module 611 for later proofreading, updating or citation.

In an embodiment of the present disclosure, the request message includes but is not limited to format information of the child book desired by the child book client 620, and the child book generating module 613 generates the corresponding child book for the child book client 620 according to the format information. In some embodiments of the present disclosure, the format information of the child book desired by the child book client 620 can be derived from the type or model of the child book client 620. For example, if the child book generating module 613 finds a mother book corresponding to the request message according to the request message, the child book generating module 613 generates a child book in the format requested in the request message based on the corresponding mother book. In the embodiment, the child book is generated in such a manner that the child book generating module 613 automatically rearranges the mother book online according to the type of the child book client 620. For example, for a smart phone and a tablet computer which are two different types of child book clients 620 and have a respective screen of different size, the child book generating module 613 will automatically rearrange the mother book online based on the size of the screen to generate the child book suitable for reading at each type of child book client 620, so as to guarantee a clear display effect of the child book at each type of child book client 620. In other examples of the present disclosure, the child book generating module 613 can generate, in advance, the child books desired by the child book clients 620 commonly used at present, such that the child book generating module 613 can make a simple choice from the pre-generated child books according to the request message after the receiving module 612 receives the request message from the child book client 620.

In an embodiment of the present disclosure, the receiving module 612 receives the request message transmitted by the child book client 620, in which the request message can be transmitted to the receiving module 612 according to the instruction of the user after the user logs in a particular electronic book program. In the embodiments of the present disclosure, the request message includes information for identifying the mother book, such as an identifier or a serial number corresponding to the mother book.

In some examples, the child book includes a child information file, such that the child book client acquires the first position information of the content corresponding to the operation instruction in the mother book according to the child information file. The child information file is generated by the mother book server 610 while generating the child book based on the mother book. Further, the child information file records a second position information of a page of a content in the child book in the mother book. Specifically, the child book has one child information file, but different child books have different child information files, since different child books have different typesetting processes. For example, as for the Xelatex typesetting program, the child information file can be called reverse reference syntax file, i.e. being able to jump to the typesetting source code by clicking PDF. The child information file records the positions of pages of all the texts and pictures in the child book in the mother book, and the correspondences can be calculated by X-Y coordinate transformation. Thus, the mother book server 610 may acquire the position of a certain page of the child book in the mother book according to the child information file of the child book.

For example, as for the process that the mother book server 610 acquires the content corresponding to the operation instruction from the mother book server 610 according to the first position information, specifically, when the mother book server 610 receives an instruction of duplicating the content of a certain page of the child book via the child book client 620, the content at the corresponding position in the mother book will be sent to the child book client 620 according to the position of the content in the mother book, so as to realize the operation of duplicating the content.

In an example of the present disclosure, the mother book server 610 is further configured to generate a serial number corresponding to the mother book according to a content of the mother book. For example, the mother book server 610 subjects the content of the mother book to SHA-1 algorithm, and extracts the first N characters of a result from SHA-1 algorithm as the above serial number, N being, for example, 12. It is known that each mother book corresponds to a unique number. Moreover, the mother book and the child book have identical serial numbers. Further, there are a plurality of child book clients 620, such as a mobile terminal, a tablet computer, a PC and an electronic book reader. In other words, the child books with the same number at various child book clients 620 correspond to the unique mother book. Thus, all the child book clients 620 with different screen sizes can communicate and edit collaboratively regarding content of a certain page, which may bring great convenience in specific applications such as distance education and distance learning. In addition, the child books are arranged individually for the child book clients 620 with different screen sizes, so as to guarantee a clear display effect of the child book individually arranged at various child book clients 620.

Further, the mother book server 610 is configured to generate fingerprint information corresponding to the mother book according to a part of the content of the mother book. For example, the mother book server 610 samples several content blocks in the mother book randomly, like five content blocks, and generates fingerprint information. The fingerprint information can be used for removal of repeated content and rapid anti-plagiarism regarding the mother book, so as to improve the quality of the mother book and avoid the occurrence of piracy, thus protecting the copyright of the mother book.

In order to further improve the protection of copyright of the mother book, the child book generating module 613 is configured to select and transmit a protected format or a non-protected format of the child book to the child book client 620 according to the copyright protection information of the mother book. Specifically, after acquiring the copyright protection information of the mother book, the child book generating module 613 selects and transmits the protected format or non-protected format of the child book to the child book client 620 according to the copyright protection information. For example, if the author of the mother book has a relatively low requirement on protection level of the mother book, the child book generating module 613 can select the non-protected format of the child book and transmit the non-protected format of the child book to the child book client 620, in which the non-protected format of the child book may be a complete child book in PDF format, and the content thereof can be edited or duplicated. If the author of the mother book has a higher requirement on protection level of the mother book, the child book generating module 613 will print the mother book in PDF format into pictures for generating the child book, and transmits the child book to the child book client 620. In the embodiment, the format of the pictures is but not limited to PNG format or DJVU format. Hence, the copyright of the mother book can be protected in a high level, so as to protect the copyright of the mother book from infringement. Further, after the child book client 620 obtains the child book, it can be judged whether the format of the child book is original PDF or DRM-protected PDF (i.e. pictures). If the user demands to duplicate or search the protected PDF, the child book client 620 can calculate the position of the current page in the source code of the mother book according to the typesetting information file, and the child book generating module 613 can transmit the corresponding page of text to the child book.

In order to further protect the copyright of the mother book, the mother book server 610 can be configured to acquire authority information of the child book client 620, and to manage the content acquired by the child book client 620 according to the authority information, in which the authority information contains page information of the mother book available to the child book client 620. For example, this can be achieved by logging in. In other words, the child book client 620 requires the user to log in. The logged-in users are classified—different classes of users have different levels of authority that correspond to different authority scopes, such that each logged-in user can only request for the number of pages within the authority scope, and cannot request for text from the mother book continuously, i.e. cannot request for text from the mother book repeatedly, otherwise the copyright protection cannot be fulfilled.

In addition, the authority information also includes content capacity information of the mother book available to the child book client 620. Specifically, for instance, the content capacity information of the mother book available to the child book client 620 cannot exceed 50% of the total content information of the mother book. Specifically, the mother book server 610 records a request volume of all the child book clients 620 for the protected content, and if the request volume has exceeded the predetermined value (like 50%), the child book client 620 will be locked. When the child book client 620 is locked, only the search function may be provided for the child book client 620 but the functions of duplicating or copying new pages are limited. Therefore, the copyright protection of the mother book is further enhanced.

In an embodiment of the present disclosure, the child book generating module 613 is configured to generate a corresponding child book for the child book client according to customized information sent by the child book client. Specifically, the child book client 620 receives the customized information from the user and sends the customized information to the child book generating module 613 of the mother book server 610, and the child book generating module 613 generates the child book for the child book client 620 according to the customized information. In the embodiment, the customized information includes but is not limited to font size or customized format. That is, the child book client 620 can send a command about the font size or customized format to the child book generating module 613, and if the child book generating module 613 verifies that the child book client 620 is authorized, the child book is rearranged and sent to the child book client 620.

The mother book server according to embodiments of the present disclosure can automatically rearrange the mother book online based on the request message from the child book client (for example, the size of a screen of the child book client) to generate a child book suitable for reading at the child book client, thus guaranteeing a clear display effect of the child book at various clients. In addition, the mother book server according to the embodiments of the present disclosure also has an advantage of high adaptability.

Figure 8:
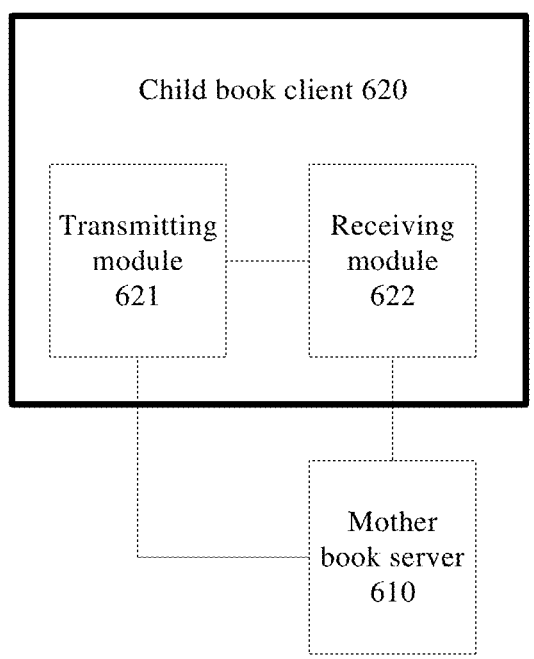
FIG. 8 is a block diagram of a child book client according to another embodiment of the present disclosure.

FIG. 8 is a block diagram of a child book client according to an embodiment of the present disclosure. As shown in FIG. 8, the child book client 620 according to an embodiment of the present disclosure includes a transmitting module 621 and a receiving module 622.

The transmitting module 621 is configured to transmit a request message to the mother book server 610. The receiving module 622 is configured to receive a child book generated by the mother book server 610 according to the request message and a mother book in the mother book server 610.

Specifically, the mother book server 610 is but not limited to a cloud server. In examples of the present disclosure, the mother book server 610 may generate the mother book in various manners. For example, the mother book server 610 generates the mother book according to a document compiled by the author. That is, the author compiles the document according to a designated format, and the mother book server 610 generates the mother book based on the compiled document. In this embodiment, the designated format is but not limited to a BDF format, and any other known formats can be employed.

In addition, the mother book server 610 can generate the mother book in the following way. Specifically, the mother book server 610 receives a query transmitted by the child book client 620 which can be a smart phone, a tablet computer, a personal computer (PC), an electronic book reader, etc. For example, the mother book server 610 has the function of a search engine or relies on an existing search engine, like Baidu search engine. The mother book server 610 performs a search according to the query to obtain a plurality of search results, and aggregates the plurality of search results to generate the mother book.

In the above example, the mother book server 610 can extract resulting information from the plurality of search results and coverts the information into the mother book. Specifically, the mother book server 610 receives the query transmitted by the child book client 620, and the mother book server 610 performs the search according to the query to obtain the plurality of search results. Meanwhile, the mother book server 610 can automatically aggregate the plurality of search results according to correlation algorithm in the background, and generate an electronic document or an electronic book. In a specific example of the present disclosure, the correlation algorithm determines the correlation according to, for example, clicking on logs, or automatically removes repeated and irrelevant content (such as navigation bars on a webpage, copyright information at the bottom, etc.) using relevant and recommended entries from Baidupedia and Wikipedia.

Further, in the process of typesetting and generating the mother book, the mother book server 610 can employ a typesetting program, such as Xelatex typesetting program with open source codes, typesetting programs of Founder Bookmaker, Indesign typesetting programs from Aode, etc. The mother book generated is but not limited to in PDF format. In this process, the mother book server 610 stores typesetting information (for example, in the Xelatex typesetting program, the typesetting information can be called reverse reference syntax file, i.e. being able to jump to the typesetting source code by clicking the PDF). In this example, the mother book can include a zip package containing original webpage information, PDF and typesetting information, and the mother book is default to be in a standard format. The mother book is stored in the mother book server 610 for later proofreading, updating or citation.

In an embodiment of the present disclosure, the request message includes but is not limited to format information of the child book desired by the child book client 620, and the mother book server 610 generates the corresponding child book for the child book client 620 according to the format information. In some embodiments of the present disclosure, the format information of the child book desired by the child book client 620 can be derived from the type or model of the child book client 620. For example, if the mother book server 610 finds a mother book corresponding to the request message according to the request message, the mother book server 610 generates a child book in the format requested in the request message based on the corresponding mother book. In the embodiment, the child book is generated in such a manner that the mother book server 610 automatically rearranges the mother book online according to the type of the child book client 620. For example, for a smart phone and a tablet computer which are two different types of child book clients 620 and have different sizes of screens, the mother book server 610 will automatically rearrange the mother book online based on the size of the screen to generate the child book suitable for reading at each type of child book client 620, so as to guarantee a clear display effect of the child book at each type of child book client 620. In other examples of the present disclosure, the mother book server 610 can generate, in advance, the child books desired by the child book clients 620 commonly used at present, such that the mother book server 610 can make a simple choice from the pre-generated child books according to the request message after receiving the request message from the child book client 620.

In an embodiment of the present disclosure, the transmitting module 621 of the child book client 620 transmits a request message to the mother book server 610, in which the request message can be transmitted to the mother book server 610 according to the instruction of the user after the user logs in a particular electronic book program. In embodiments of the present disclosure, the request message includes information for identifying the mother book, such as an identifier or a serial number corresponding to the mother book.

In some examples, the child book includes a child information file, and the child book client 620 acquires the first position information of the content corresponding to the operation instruction in the mother book according to the child information file. The child information file is generated by the mother book server 610 while generating the child book based on the mother book. Further, the child information file records a second position information of a page of a content in the child book in the mother book. Specifically, the child book has one child information file, but different child books have different child information files, since different child books have different typesetting processes. For example, as for the Xelatex typesetting program, the child information file can be called reverse reference syntax file, i.e. being able to jump to the typesetting source code by clicking PDF. The child information file records the positions of pages of all the texts and pictures in the child book in the mother book, and the correspondences can be calculated by X-Y coordinate transformation. Thus, the mother book server 610 may acquire the position of a certain page of the child book in the mother book according to the child information file of the child book.

For example, as for the process that the mother book server 610 acquires the content corresponding to the operation instruction from the mother book server 610 according to the first position information, specifically, when the mother book server 610 receives an instruction of duplicating the content of a certain page of the child book via the child book client 620, the content at the corresponding position in the mother book will be sent to the child book client 620 according to the position of the content in the mother book, so as to realize the operation of duplicating the content.

In an example of the present disclosure, the mother book has a serial number generated according to a content thereof. Specifically, the mother book server 610 can generate a serial number corresponding to the mother book according to the content of the mother book. For example, the mother book server 610 subjects the content of the mother book to SHA-1 algorithm, and extracts the first N characters of a result from the SHA-1 algorithm as the above serial number, N being, for example, 12. It is known that each mother book corresponds to a unique number. Moreover, the mother book and the child book have identical serial numbers. Further, there are a plurality of child book clients 620, such as a mobile terminal, a tablet computer, a PC and an electronic book reader. In other words, the child books with the same number at various child book clients 620 correspond to the unique mother book. Thus, all the child book clients 620 with different screen sizes can communicate and edit collaboratively regarding content of a certain page, which bring great convenience in specific applications such as distance education and distance learning. In addition, the child books are arranged individually for the child book clients 620 with different screen sizes, so as to guarantee a clear display effect of the child book individually arranged at various child book clients 620.

Further, the mother book server 610 can be configured to generate fingerprint information corresponding to the mother book according to a part of the content of the mother book. For example, the mother book server 610 samples several content blocks in the mother book randomly, like five content blocks, and generates fingerprint information. The fingerprint information can be used for removal of repeated content and rapid anti-plagiarism regarding the mother book, so as to improve the quality of the mother book and avoid the occurrence of piracy, thus protecting the copyright of the mother book.

In order to further improve the protection of copyright of the mother book, the mother book server 610 acquires the copyright protection information of the mother book, selects and transmits a protected format or a non-protected format of the child book to the child book client 620 according to the copyright protection information of the mother book. For example, if the author of the mother book has a relatively low requirement on protection level of the mother book, the mother book server 610 can select the non-protected format of the child book and transmit the non-protected format of the child book to the child book client 620, in which the non-protected format of the child book may be a complete child book in PDF format, and the content thereof can be edited or duplicated. If the author of the mother book has a higher requirement on protection level of the mother book, the mother book server 610 will print the mother book in PDF format into pictures for generating the child book, and transmits the child book to the child book client 620. In the embodiment, the format of the pictures is but not limited to PNG format or DJVU format. Hence, the copyright of the mother book can be protected in a high level, so as to protect the copyright of the mother book from infringement. Further, after the child book client 620 obtains the child book, it can be judged whether the format of the child book is original PDF or DRM-protected PDF (i.e. pictures). If the user demands to duplicate or search the protected PDF, the child book client 620 can calculate the position of the current page in the source code of the mother book according to the typesetting information file, and the mother book server 610 can transmit the corresponding page of text to the child book.

In order to further protect the copyright of the mother book, the mother book server 610 can be configured to acquire authority information of the child book client 620, and to manage the content acquired by the child book client 620 according to the authority information, in which the authority information contains page information of the mother book available to the child book client 620. For example, this can be achieved by logging in. In other words, the child book client 620 requires the user to log in. The logged-in users are classified—different classes of users have different levels of authority that correspond to different authority scopes, such that each logged-in user can only request for the number of pages within the authority scope, and cannot request for text from the mother book continuously, i.e. cannot request for text from the mother book repeatedly, otherwise the copyright protection cannot be fulfilled.

In addition, the authority information also includes content capacity information of the mother book available to the child book client 620. Specifically, for instance, the content capacity information of the mother book available to the child book client 620 cannot exceed 50% of the total content information of the mother book. Specifically, the mother book server 610 records a request volume of all the child book clients 620 for the protected content, and if the request volume has exceeded the predetermined value (like 50%), the child book client 620 will be locked. When the child book client 620 is locked, only the search function may be provided for the child book client 620 but the functions of duplicating or copying new pages are limited. Therefore, the copyright protection of the mother book is further enhanced.

In an embodiment of the present disclosure, the child book client 620 is configured to receive customized information of the user and send the customized information to the mother book server 610, and the mother book server 610 is configured to generate the child book for the child book client 620 according to the customized information. In the embodiment, the customized information includes but is not limited to font size or customized format. That is, the child book client 620 can send a command about the font size or customized format to the mother book server 610, and if the mother book server 610 verifies that the child book client 620 is authorized, the child book is rearranged and sent to the child book client 620.

The child book client according to the embodiments of the present disclosure can transmit the request message to the mother book server, such that the mother book server automatically rearranges the mother book online based on the request message (for example, the size of a screen of the child book client) to generate a child book suitable for reading at the child book client, thus guaranteeing a clear display effect of the child book at various clients. The child book client according to embodiments of the present disclosure can include various types of clients, such as a PC, a smart phone, a tablet computer and an electronic book reader, and have an advantage of high adaptability.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment.

More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, these terms throughout this specification do not necessarily refer to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, modifications, alternatives and variations can be made in the embodiments within the scope of the present disclosure.

What is claimed is:

1. A method for providing an electronic document, comprising:
generating a mother book by a mother book server;
receiving, by the mother book server, a request message transmitted by a child book client;
generating, by the mother book server, a corresponding child book for the child book client according to the request message and the mother book, and transmitting the child book to the child book client;
generating, by the mother book server, a child information file, which records positions of pages of content in the child book in the mother book, wherein the correspondence of positions of content in the child book and the mother book are calculated via X-Y coordinate transformation;
acquiring, by the child book client, a first position information of a content corresponding to an operation instruction in the mother book, when the child book client receives the operation instruction from a user;
acquiring, by the child book client, the content corresponding to the operation instruction from the mother book server according to the first position information;
acquiring authority information of the child book client by the mother book server;
managing, by the mother book server, the content acquired by the child book client according to the authority information;
receiving customized information by the child book client from the user, and sending the customized information to the mother book server by the child book client; and
when the mother book server verifies that the child book client is authorized to generate the child book according to the customized information, based on the authority information, generating the child book by the mother book server for the child book client according to the customized information, wherein the customized information includes font size, and a font size of the child book is different from a font size of the mother book;
wherein the operation instruction is an instruction to edit the content in the child book.

2. The method according to claim 1, wherein the child information file records a second position information of a page of a content in the child book in the mother book.

3. The method according to claim 1, wherein generating the mother book by the mother book server comprises:
generating the mother book by the mother book server according to a document compiled by an author.

4. The method according to claim 1, wherein generating the mother book by the mother book server comprises:
receiving, by the mother book server, a query transmitted by the child book client;
performing a search by the mother book server according to the query to obtain a plurality of search results; and
aggregating the plurality of search results by the mother book server to generate the mother book.

5. The method according to claim 3, further comprising:
generating, by the mother book server, a serial number corresponding to the mother book according to a content of the mother book;
wherein the mother book and the child book have identical serial numbers.

6. The method according to claim 1, wherein the request message comprises format information of the child book desired by the child book client, and the mother book server generates the corresponding child book for the child book client according to the format information.

7. The method according to claim 1, further comprising:
generating, by the mother book server, fingerprint information corresponding to the mother book according to a part of the content of the mother book.

8. The method according to claim 1, further comprising:
acquiring copyright protection information of the mother book by the mother book server; and
selecting and transmitting a protected format or a non-protected format of the child book to the child book client by the mother book server according to the copyright protection information of the mother book.

9. The method according to claim 1, wherein the authority information comprises page information of the mother book available to the child book client and/or content capacity information of the mother book available to the child book client.

10. The method according to claim 1, wherein there are a plurality of child book clients.

11. A mother book server, comprising:
one or more processors configured to execute one or more software modules, the one or more software modules including:
a mother book generating module configured to generate a mother book;
a receiving module configured to receive a request message transmitted by a child book client;
a child book generating module configured to generate a corresponding child book for the child book client according to the request message and the mother book, and to transmit the child book to the child book client; and
a managing module configured to receive an operation request generated by the child book client according to an operation instruction from a user and a first position information of a content corresponding to the operation instruction in the mother book, and to transmit the content corresponding to the operation instruction to the child book client according to the first position information;
wherein the child book comprises a child information file, which records positions of pages of all content in the child book in the mother book, wherein the correspondence of positions of content in the child book and the mother book are calculated via X-Y coordinate transformation such that the child book client acquires the first position information of the content corresponding to the operation instruction in the mother book according to the child information file;
wherein the operation instruction is an instruction to edit the content in the child book;
wherein the managing module is further configured to acquire authority information of the child book client and manage the content acquired by the child book client according to the authority information;
wherein the child book generating module is further configured to receive customized information sent by the child book client, and when the managing module verifies that the child book client is authorized to generate the child book according to the customized information, based on the authority information, generate the child book for the child book client according to the customized information, wherein the customized information includes font size, and a font size of the child book is different from a font size of the mother book.

12. The mother book server according to claim 11, wherein the child information file records a second position information of a page of a content in the child book in the mother book.

13. The mother book server according to claim 11, further comprising:
a searching module configured to perform a search according to a query transmitted by the child book client to obtain a plurality of search results, such that the mother book generating module aggregates the plurality of search results to generate the mother book.

14. The mother book server according to claim 11, further comprising:
a serial number generating module configured to generate a serial number corresponding to the mother book according to a content of the mother book.

15. The mother book server according to claim 11, wherein the request message comprises format information of the child book desired by the child book client, and the child book generating module generates the corresponding child book for the child book client according to the format information.

16. The mother book server according to claim 11, further comprising:
a fingerprint generating module configured to generate fingerprint information corresponding to the mother book according to a part of the content of the mother book.

17. A child book client, comprising:
one or more processors configured to execute one or more software modules, the one or more software modules including:
a transmitting module configured to transmit a request message to a mother book server;
a receiving module configured to receive a child book generated by the mother book server according to the request message and a mother book in the mother book server; and
an operation control module configured to receive an operation instruction from a user, to acquire a first position information of a content corresponding to the operation instruction in the mother book, and to obtain the content corresponding to the operation instruction in the mother book server according to the first position information;
wherein the child book comprises a child information file, which records positions of pages of all content in the child book in the mother book, wherein the correspondence of positions of content in the child book and the mother book are calculated via X-Y coordinate transformation such that the child book client acquires the first position information of the content corresponding to the operation instruction in the mother book according to the child information file;
wherein the operation instruction is an instruction to edit the content in the child book;
wherein the transmitting module is further configured to transmit authority information of the child book client to the mother book server which manages the content acquired by the child book client according to the authority information;
wherein the operation control module is further configured to receive customized information from the user, send the customized information to the mother book server, such that when the mother book server verifies that the child book client is authorized to generate the child book according to the customized information, based on the authority information, mother book server generates the child book for the child book client according to the customized information, wherein the customized information includes font size, and a font size of the child book is different from a font size of the mother book.

18. The child book client according to claim 17, wherein the child information file records a second position information of a page of a content in the child book in the mother book.

19. The child book client according to claim 17, wherein the request message comprises format information of the child book desired by the child book client, such that the mother book server generates the corresponding child book for the child book client according to the format information.

* * * * *